(12) United States Patent
Park et al.

(10) Patent No.: US 9,369,998 B2
(45) Date of Patent: Jun. 14, 2016

(54) METHOD FOR DETERMINING UPLINK RESOURCE, METHOD FOR TRANSMITTING UPLINK CONTROL SIGNAL USING SAME, AND APPARATUS THEREFOR

(71) Applicant: LG ELECTRONICS INC., Seoul (KR)

(72) Inventors: Jonghyun Park, Anyang-si (KR); Kijun Kim, Anyang-si (KR); Hakseong Kim, Anyang-si (KR)

(73) Assignee: LG ELECTRONICS INC., Seoul (KR)

( * ) Notice: Subject to any disclaimer, the term of this patent is extended or adjusted under 35 U.S.C. 154(b) by 120 days.

(21) Appl. No.: 14/390,359

(22) PCT Filed: Apr. 10, 2013

(86) PCT No.: PCT/KR2013/002997
§ 371 (c)(1),
(2) Date: Oct. 2, 2014

(87) PCT Pub. No.: WO2013/157772
PCT Pub. Date: Oct. 24, 2013

(65) Prior Publication Data
US 2015/0055582 A1    Feb. 26, 2015

Related U.S. Application Data

(60) Provisional application No. 61/624,385, filed on Apr. 15, 2012.

(51) Int. Cl.
*G08C 15/00*    (2006.01)
*H04W 4/00*    (2009.01)
(Continued)

(52) U.S. Cl.
CPC ........... *H04W 72/0413* (2013.01); *H04L 5/001* (2013.01); *H04L 5/0055* (2013.01);
(Continued)

(58) Field of Classification Search
CPC ............ H04W 72/04; H04W 72/0413; H04W 72/042; H04L 5/001; H04L 5/0023; H04L 5/0035; H04L 5/0055; H04L 5/0094; H04L 5/1469
USPC ......... 370/203–211, 229–240, 310–350, 431, 370/437–439, 464–465
See application file for complete search history.

(56) References Cited

U.S. PATENT DOCUMENTS 9,258,812 B2 *  2/2016  Han ...................... H04L 1/1861
2011/0194525 A1   8/2011  Nishio et al.
(Continued)

OTHER PUBLICATIONS

NEC Group, "PUCCH allocation for ACK/NACK transmission," 3GPP TSG RAN WG1 Meeting #50, R1-073462, Aug. 2007, 4 pages.
(Continued)

*Primary Examiner* — Tri H Phan
(74) *Attorney, Agent, or Firm* — Lee, Hong, Degerman, Kang & Waimey; Jonathan Kang; Harry Lee

(57) ABSTRACT

A method for transmitting uplink control information in a wireless communication system according to one embodiment of the present invention comprises: detecting downlink control information from a downlink control channel; and transmitting uplink control information using a resource of an uplink control channel determined on the basis of a control channel element (CCE) index of the downlink control channel from which the downlink control information is detected, and a user equipment (UE)-specific offset value for determining a resource of an uplink control channel. The uplink control information for at least two downlink control channels having different first CCE indexes can be assigned in the resource of the same uplink control channel.

20 Claims, 10 Drawing Sheets

(51) Int. Cl.
*H04J 3/16* (2006.01)
*H04W 72/04* (2009.01)
*H04L 5/00* (2006.01)
*H04L 5/14* (2006.01)

(52) U.S. Cl.
CPC ............ *H04L5/0094* (2013.01); *H04L 5/1469* (2013.01); *H04W 72/042* (2013.01); *H04L 5/0023* (2013.01); *H04L 5/0035* (2013.01)

(56) References Cited

U.S. PATENT DOCUMENTS

| | | | | |
|---|---|---|---|---|
| 2011/0199997 | A1* | 8/2011 | Wennstrom | H04L 1/1607 370/329 |
| 2011/0228731 | A1* | 9/2011 | Luo | H01Q 3/2605 370/329 |
| 2013/0010724 | A1* | 1/2013 | Han | H04L 5/0007 370/329 |
| 2013/0088973 | A1* | 4/2013 | Yang | H04L 5/003 370/241 |
| 2014/0192757 | A1* | 7/2014 | Lee | H04L 1/1861 370/329 |
| 2014/0241298 | A1* | 8/2014 | Park | H04W 72/0413 370/329 |

OTHER PUBLICATIONS

Sharp, "PUCCH resource for ePDCCH," 3GPP TSG RAN WG1 Meeting #68bis, R1-121355, Mar. 2012, 3 pages.
LG Electronics, "PUCCH enhancements for UL-CoMP," 3GPP TSG RAN WG1 Meeting #68bis, R1-121450,Mar. 2012, 3 pages.
Samsung, "Further discussions on PUCCH transmissions for UL CoMP," 3GPP TSG RAN WG1 Meeting #68bis, R1-121638, Mar. 2012, 3 pages.
PCT International Application No. PCT/KR2013/002997, Written Opinion of the International Searching Authority dated Jul. 15, 2013, 18 pages.

* cited by examiner

METHOD FOR DETERMINING UPLINK RESOURCE, METHOD FOR TRANSMITTING UPLINK CONTROL SIGNAL USING SAME, AND APPARATUS THEREFOR

CROSS-REFERENCE TO RELATED APPLICATIONS

This application is the National Stage filing under 35 U.S.C. 371 of International Application No. PCT/KR2013/002997, filed on Apr. 10, 2013, which claims the benefit of U.S. Provisional Application Ser. No. 61/624,385, filed on Apr. 15, 2012, the contents of which are hereby incorporated by reference herein in their entirety.

TECHNICAL FIELD

The present invention relates to a wireless communication system, and more particularly, to a method for determining uplink resources, a method for transmitting an uplink control signal using the same, and an apparatus for the methods.

BACKGROUND ART

Various techniques including Machine-to-Machine (M2M) communication and various devices including a smart phone requiring a high data rate, a tablet Personal Computer (PC), etc. have emerged and gained popularity. As a consequence, the amount of data to be processed in a cellular network is rapidly increasing. To satisfy the ever-increasing data processing requirement, Carrier Aggregation (CA), cognitive radio, etc. for efficiently using more frequency bands, and Multiple Input Multiple Output (MIMO), Coordinated Multipoint transmission and reception (CoMP), etc. for increasing the amount of data transmitted in limited frequencies have been developed. Also, communication environment is evolving toward an increased density of nodes accessible to User Equipments (UEs). A node refers to a fixed point with one or more antennas, which may transmit or receive wireless signals to or from a UE. A communication system with densely populated nodes may provide a high-performance communication service to UEs through cooperation between nodes.

In this multi-node cooperative communication scheme in which a plurality of nodes communicate with a UE using the same time-frequency resources, each node operates as an independent Base Station (BS) and thus offers a higher throughput than in a conventional communication scheme in which a node communicates with a UE without cooperation from other nodes.

A multi-node system performs cooperative communication using a plurality of nodes each operating as a BS, an Access Point (AP), an antenna, an antenna group, a Radio Remote Header (RRH), or a Radio Remote Unit (RRU). Compared to a conventional centralized antenna system in which antennas are concentrated in a BS, the plurality of nodes are generally apart from each other by a predetermined distance or larger in the multi-node system. The plurality of nodes may be managed by one or more BSs or one or more BS Controllers (BSCs) that control an operation of each node or schedule data to be transmitted or received through each node. Each node is connected to a BS or BSC that controls the node by cable or a dedicated line.

[5] The above-described multi-node system may be regarded as a MIMO system in the sense that distributed nodes may communicate with one or more UEs by transmitting or receiving different streams at the same time. However, since signals are transmitted using nodes distributed to various locations, each antenna covers a reduced transmission area in the multi-node system, relative to antennas in the conventional centralized antenna system. As a result, each antenna may need a reduced transmission power in transmitting a signal in the multi-node system, compared to a conventional system that implements MIMO with a centralized antenna system. In addition, as the transmission distance between an antenna and a UE is reduced, path loss is decreased and high-rate data transmission is possible. Accordingly, the transmission capacity and power efficiency of a cellular system may be increased and communication may be conducted with uniform quality irrespective of the locations of UEs within a cell. Further, the multi-node system boasts of reduced signal loss during transmission because a BS(s) or BSC(s) connected to a plurality of nodes cooperate in data transmission and reception. If nodes apart from each other by a predetermined distance or larger conduct cooperative communication with a UE, correlation and interference between antennas are decreased. Consequently, the multi-node cooperative communication scheme achieves a high Signal-to-Interference plus Noise Ratio (SINR).

Owing to these advantages of the multi-node system, the multi-node system has emerged as a promising basis for cellular communication by substituting for the conventional centralized antenna system or operating in conjunction with the conventional centralized antenna system in order to reduce BS deployment cost and backhaul maintenance cost, extend service coverage, and increase channel capacity and SINR.

DISCLOSURE

Technical Problem

An object of the present invention devised to solve the conventional problem is to provide a method for determining resources for an uplink control channel.

Another object of the present invention is to provide a method for transmitting uplink control information using resources of an uplink control channel.

It will be appreciated by persons skilled in the art that the objects that could be achieved with the present invention are not limited to what has been particularly described hereinabove and the above and other objects that the present invention could achieve will be more clearly understood from the following detailed description.

Technical Solution

In an aspect of the present invention, a method for transmitting uplink control information in a wireless communication system includes detecting downlink control information in a downlink control channel and transmitting uplink control information via resources for an uplink control channel, determined based on a Control Channel Element (CCE) index of the downlink control channel from which the downlink control information is detected and a User Equipment (UE)-specific offset value configured for determination of resources for the uplink control channel. Uplink control information related to at least two downlink control channels having different first CCE indexes may be allocated to the same resources for the uplink control channel.

Additionally or alternatively, the resources for the uplink control channel may be determined by the following equation, $n_{PUCCH}^{(1)} = \text{floor}(n_{CCE}/A) + N_{PUCCH\_UE}^{(1)}$ where $n_{PUCCH}^{(1)}$ is an index of the resources for the uplink control channel $N_{PUCCH\_UE}^{(1)}$ is the UE-specific offset value used for determination of resources for the uplink control channel, floor(X) is a largest integer equal to or less than X, $n_{CCE}$ is the first CCE index of the downlink control channel, and A is an integer equal to or larger than 1.

Additionally or alternatively, the resources for the uplink control channel resource may be determined by the following equation, $n_{PUCCH}^{(1)} = (n_{CCE} \bmod B) + N_{PUCCH\_UE}^{(1)}$ where $n_{PUCCH}^{(1)}$ is an index of the resources for the uplink control channel, $N_{PUCCH\_UE}^{(1)}$ is the UE-specific offset value used for determination of resources for the uplink control channel, Y mode Z is a remainder of dividing Y by Z, $n_{CCE}$ is the first CCE index of the downlink control channel, and B is an integer equal to or larger than 1.

Additionally or alternatively, $B = \text{floor}(N_{CCE}/N)$ where $N_{CCE}$ is a total number of CCEs in the downlink control channel and N is an integer equal to or larger than 1.

Additionally or alternatively, the UE-specific offset used for determination of resources for the uplink control channel is one of a plurality of candidate UE-specific offset values received by higher-layer signaling.

In another aspect of the present invention, a UE for transmitting uplink control information in a wireless communication system includes a Radio Frequency (RF) unit, and a processor configured to control the RF unit. The processor may be configured to detect downlink control information in a downlink control channel and transmit uplink control information via resources for an uplink control channel, determined based on a CCE index of the downlink control channel from which the downlink control information is detected and a UE-specific offset value configured for determination of the resources for the uplink control channel. Uplink control information related to at least two downlink control channels having different first CCE indexes may be allocated to the same resources for the uplink control channel.

Additionally or alternatively, the resources for the uplink control channel may be determined by the following equation, $n_{PUCCH}^{(1)} = \text{floor}(n_{CCE}/A) + N_{PUCCH\_UE}^{(1)}$ where $n_{PUCCH}^{(1)}$ is an index of the resources for the uplink control channel, $N_{PUCCH\_UE}^{(1)}$ is the UE-specific offset value used for determination of resources for the uplink control channel, floor(X) is a largest integer equal to or less than X, $n_{CCE}$ is the first CCE index of the downlink control channel, and A is an integer equal to or larger than 1.

Additionally or alternatively, the resources for the uplink control channel may be determined by the following equation, $n_{PUCCH}^{(1)} = (n_{CCE} \bmod B) + N_{PUCCH\_UE}^{(1)}$ where $n_{PUCCH}^{(1)}$ is an index of the resources for the uplink control channel, $N_{PUCCH\_UE}^{(1)}$ is the UE-specific offset value used for determination of resources for the uplink control channel, Y mode Z is a remainder of dividing Y by Z, $n_{CCE}$ is the first CCE index of the downlink control channel, and B is an integer equal to or larger than 1.

Additionally or alternatively, $B = \text{floor}(N_{CCE}/N)$ where $N_{CCE}$ is a total number of CCEs in the downlink control channel and N is an integer equal to or larger than 1.

Additionally or alternatively, the UE-specific offset used for determination of resources for the uplink control channel may be one of a plurality of candidate UE-specific offset values received by higher-layer signaling.

In another aspect of the present invention, a method for determining resources for an uplink control channel in a wireless communication system includes determining resources for the uplink control channel, for transmission of uplink control information from each UE, based on a CCE index of a downlink control channel from which downlink control information is detected by the UE and a UE-specific offset value configured for determination of resources for the uplink control channel. Uplink control information related to at least two downlink control channels having different first CCE indexes may be allocated to the same resources for the uplink control channel.

Additionally or alternatively, the resources for the uplink control channel)) may be determined by the following equation, $n_{PUCCH}^{(1)} = \text{floor}(n_{CCE}/A) + N_{PUCCH\_UE}^{(1)}$, where $n_{PUCCH}^{(1)}$ is an index of the resources for the uplink control channel $N_{PUCCH\_UE}^{(1)}$ is the UE-specific offset value used for determination of resources for the uplink control channel, floor(X) is a largest integer equal to or less than X, $n_{CCE}$ is the first CCE index of the downlink control channel, and A is an integer equal to or larger than 1.

Additionally or alternatively, the resources for the uplink control channel may be determined by the following equation, $n_{PUCCH}^{(1)} = (n_{CCE} \bmod B) + N_{PUCCH\_UE}^{(1)}$, where $n_{PUCCH}^{(1)}$ is an index of the resources for the uplink control channel $N_{PUCCH\_UE}^{(1)}$ is the UE-specific offset value used for determination of resources for the uplink control channel, Y mode Z is a remainder of dividing Y by Z, $n_{CCE}$ is the first CCE index of the downlink control channel, and B is an integer equal to or larger than 1.

Additionally or alternatively, $B = \text{floor}(N_{CCE}/N)$ where $N_{CCE}$ is a total number of CCEs in the downlink control channel and N is an integer equal to or larger than 1.

Additionally or alternatively, only one of the at least two downlink control channels may be allocated to a UE configured with a predetermined transmission mode and the other downlink control channels may be allocated to a UE configured with another transmission mode.

In another aspect of the present invention, a BS for determining resources of an uplink control channel in a wireless communication system includes an RF unit and a processor configured to control the RF unit. The processor is configured to determine resources of an uplink control channel, for transmission of uplink control information from each UE, based on a CCE index of a downlink control channel from which downlink control information is detected by the UE and a UE-specific offset value configured for determination of resources for the uplink control channel. Uplink control information related to at least two downlink control channels having different first CCE indexes may be allocated to the same resources for the uplink control channel.

Additionally or alternatively, the resources for the uplink control channel)) may be determined by the following equation, $n_{PUCCH}^{(1)} = \text{floor}(n_{CCE}/A) + N_{PUCCH\_UE}^{(1)}$, where $n_{PUCCH}^{(1)}$ is a resource index of the uplink control channel, $N_{PUCCH\_UE}^{(1)}$ is the UE-specific offset value used for determination of resources for the uplink control channel, floor(X) is a largest integer equal to or less than X, $n_{CCE}$ is the first CCE index of the downlink control channel, and A is an integer equal to or larger than 1.

Additionally or alternatively, the resources for the uplink control channel resource may be determined by the following equation, $n_{PUCCH}^{(1)} = (n_{CCE} \bmod B) + N_{PUCCH\_UE}^{(1)}$, where $n_{PUCCH}^{(1)}$ is an index of resources for the uplink control channel, $N_{PUCCH\_UE}^{(1)}$ is the UE-specific offset value used for determination of resources for the uplink control channel, Y mode Z is a remainder of dividing Y by Z, $n_{CCE}$ is the first CCE index of the downlink control channel, and B is an integer equal to or larger than 1.

Additionally or alternatively, $B = \text{floor}(N_{CCE}/N)$ where $N_{CCE}$ is a total number of CCEs in the downlink control channel and N is an integer equal to or larger than 1.

Additionally or alternatively, only one of the at least two downlink control channels may be allocated to a UE configured with a predetermined transmission mode and the other downlink control channels may be allocated to a UE configured with another transmission mode.

The technical solutions are merely a part of the embodiments of the present invention and those skilled in the art will understand that various embodiments reflecting the technical features of the present invention can be derived from a detailed description of the present invention as given below.

Advantageous Effects

The embodiments of the present invention have the effect of compressing resources of an uplink control channel for transmitting uplink control information.

Further, the embodiments of the present invention is compatible with a conventional method for determining resources for an uplink control channel and can reduce the amount of resources reserved for transmission of uplink control information.

It will be appreciated by persons skilled in the art that the effects that can be achieved with the present invention are not limited to what has been particularly described hereinabove and other advantages of the present invention will be more clearly understood from the following detailed description taken in conjunction with the accompanying drawings.

BRIEF DESCRIPTION OF THE DRAWINGS

The accompanying drawings, which are included to provide a further understanding of the invention and are incorporated in and constitute a part of this application, illustrate embodiments of the invention and together with the description serve to explain the principle of the invention. In the drawings.

BEST MODE FOR CARRYING OUT THE INVENTION

Figure 1:
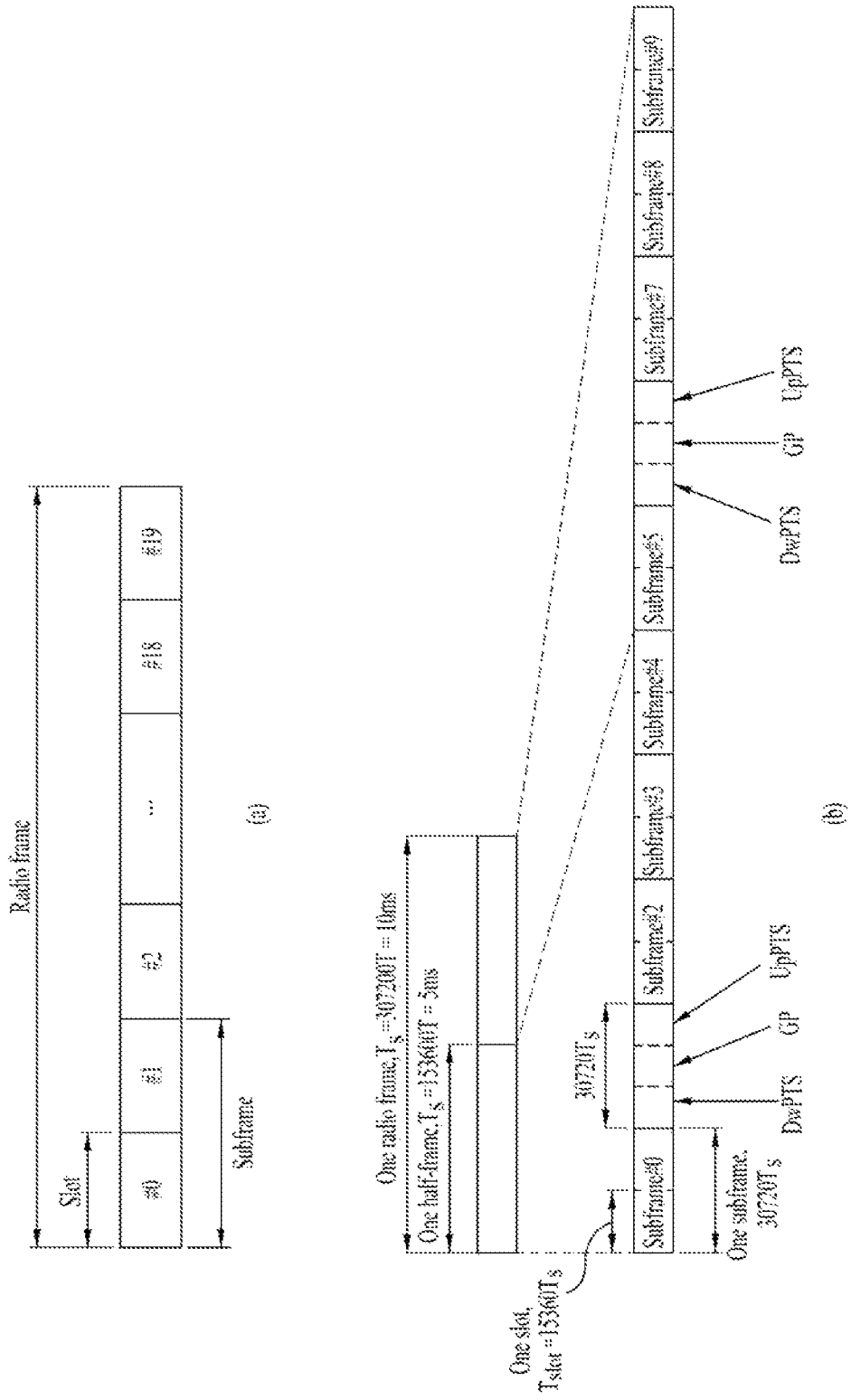
FIG. 1 illustrates an exemplary radio frame structure in a wireless communication system.

Reference will now be made in detail to the preferred embodiments of the present invention with reference to the accompanying drawings. The detailed description, which will be given below with reference to the accompanying drawings, is intended to explain exemplary embodiments of the present invention, rather than to show the only embodiments that can be implemented according to the invention. The following detailed description includes specific details in order to provide a thorough understanding of the present invention. However, it will be apparent to those skilled in the art that the present invention may be practiced without such specific details.

Techniques, devices, and systems as described below are applicable to various wireless multiple access systems. For the convenience of description, the following description is given of the present invention in the context of a 3$^{rd}$ Generation Partnership Project (3GPP) Long Term Evolution (LTE)/LTE-Advanced (LTE-A) system, which should not be construed as limiting the present invention. For example, although the following description is given in the context of the 3GPP LTE/LTE-A system as an exemplary mobile communication system, the same thing applies to other mobile communication systems except for features inherent to the 3 GPP LTE/LTE-A system.

In some instances, known structures and devices are omitted or are shown in block diagram form, focusing on important features of the structures and devices, so as not to obscure the concept of the invention. Like reference numerals denote the same components throughout the specification.

In the present invention, User Equipments (UEs) may be fixed or mobile, including various devices that transmit and receive user data and/or various types of information to and from a Base Station (BS) by communication. The term UE may be replaced with terminal equipment, Mobile Station (MS), Mobile Terminal (MT), User Terminal (UT), Subscriber Station (SS), wireless device, Personal Digital Assistant (PDA), wireless modem, handheld device, etc. A BS generally refers to a fixed station communicating with a UE and/or another BS and exchanges data and control information with a UE and another BS. The term BS may be replaced with Advanced BS (ABS), Node B (NB), evolved Node B (eNB or eNode B), Base Transceiver System (BTS), Access Point (AP), Processing Server (PS), etc.

In the present invention, a Physical Downlink Control Channel (PDCCH)/Physical Control Format Indicator Channel (PCFICH)/Physical Hybrid automatic repeat and request Indicator Channel (PHICH)/Physical Downlink Shared Channel (PDSCH) is a set of time-frequency resources or Resource Elements (REs) that deliver Downlink Control Information (DCI)/Control Format Indicator (CFI)/Downlink ACKnowledgment/Negative ACKnowledgment (DL ACK/NACK)/DL data. A Physical Uplink Control Channel (PUCCH)/Physical Uplink Shared Channel (PUSCH) is a set of time-frequency resources or REs that deliver Uplink Control Information (UCI)/Uplink (UL) data. Particularly, time-frequency resources or REs allocated to or belonging to the PDCCH/PCFICH/PHICH/PDSCH/PUCCH/PUSCH are referred to as PDCCH/PCFICH/PHICH/PDSCH/PUCCH/PUSCH resources or REs in the present invention. Thus, when it is said that a UE transmits a PUCCH/PUSCH, this means that the UE transmits UCI/UL data/random access signal on the PUCCH/PUSCH. Also, when it is said that a BS transmits a PDCCH/PCFICH/PHICH/PDSCH, this means that the BS transmits DL data/control information on the PDCCH/PCFICH/PHICH/PDSCH.

In the present invention, Cell-specific Reference Signal (CRS)/Demodulation Reference Signal (DMRS)/Channel State Information Reference Signal (CSI-RS) time-frequency resources (or REs) are time-frequency resources (or REs) that may be allocated to or are available to a CRS/DMRS/CSI-RS or time-frequency resources (or REs) carrying a CRS/DMRS/

CSI-RS. A subcarrier including a CRS/DMRS/CSI-RS is referred to as a CRS/DMRS/CSI-RS subcarrier and an Orthogonal Frequency Division Multiplexing (OFDM) symbol carrying a CRS/DMRS/CSI-RS is referred to as a CRS/DMRS/CSI-RS symbol. Also, Sounding Reference Signal (SRS) time-frequency resources (or REs) are time-frequency resources (REs) carrying an SRS for a BS to use in measuring the state of a UL channel established between a UE and the BS. An RS is a predefined signal having a special waveform, known to both a BS and a UE. An RS is also called a pilot signal.

In the present invention, a cell is defined as a predetermined geographical area in which a BS, a node(s), or an antenna port(s) provides a communication service. Therefore, communication with a specific cell amounts to communication with a BS, a node, or an antenna port that provides a communication service to the specific cell. A DL/UL signal in a specific cell means a DL/UL signal from/to a BS, a node, or an antenna port that provides a communication service to the specific cell. A channel state/quality of a specific cell refers to a channel state/quality of a channel or a communication link established between a UE and a BS, a node, or an antenna port that provides a communication service to the specific cell.

FIG. 1 illustrates an exemplary structure of a radio frame in a wireless communication system. Specifically, FIG. 1(a) illustrates an exemplary radio frame structure for Frequency Division Duplex (FDD) mode in a 3GPP LTE/LTE-A system and FIG. 1(b) illustrates an exemplary radio frame structure for Time Division Duplex (TDD) mode in the 3GPP LTE/LTE-A system.

Referring to FIG. 1, a radio frame is 10 ms (307,200 $T_s$) in duration in the 3GPP LTE/LTE-A system. The radio frame is divided into 10 equal-sized subframes which may be numbered, respectively. $T_s$ represents a sampling time and is given as $T_s=1/(2048\times15$ kHz). Each subframe is 1 ms long and further divided into two slots. The 20 slots of a radio frame may be numbered sequentially from 0 to 19. Each slot is 0.5 ms long/A unit time in which data is transmitted is defined as Transmission Time Interval (TTI). Time resources may be identified by a radio frame number (or a radio frame index), a subframe number (or a subframe index), a slot number (or a slot index), etc.

A different radio frame may be configured according to a duplex mode. For example, since DL transmission and UL transmission are distinguished from each other by frequency, a radio frame includes only DL subframes or UL subframes in a specific frequency band that operates in a specific carrier frequency in the FDD mode. In contrast, DL transmission and UL transmission are distinguished from each other by time in the TDD mode. Accordingly, a TDD radio frame includes both DL and UL subframes in a specific frequency band that operates in a specific carrier frequency.

[Table 1] lists DL-UL configurations for subframes in a radio frame.

TABLE 1

| DL-UL config-uration | Downlink-to-Uplink Switch-point periodicity | Subframe number | | | | | | | | | |
|---|---|---|---|---|---|---|---|---|---|---|---|
| | | 0 | 1 | 2 | 3 | 4 | 5 | 6 | 7 | 8 | 9 |
| 0 | 5 ms | D | S | U | U | U | D | S | U | U | U |
| 1 | 5 ms | D | S | U | U | D | D | S | U | U | D |
| 2 | 5 ms | D | S | U | D | D | D | S | U | D | D |
| 3 | 10 ms | D | S | U | U | U | D | D | D | D | D |
| 4 | 10 ms | D | S | U | U | D | D | D | D | D | D |
| 5 | 10 ms | D | S | U | D | D | D | D | D | D | D |
| 6 | 5 ms | D | S | U | U | U | D | S | U | U | D |

In [Table 1], D represents DL subframe, U represents UL subframe, and S represent special subframe. A special subframe includes three fields, Downlink Pilot Time Slot (DwPTS), Guard Period (GP), and Uplink Pilot Time Slot (UpPTS). The DwPTS is a time interval reserved for DL transmission and the UpPTS is a time interval reserved for UL transmission.

Figure 2:
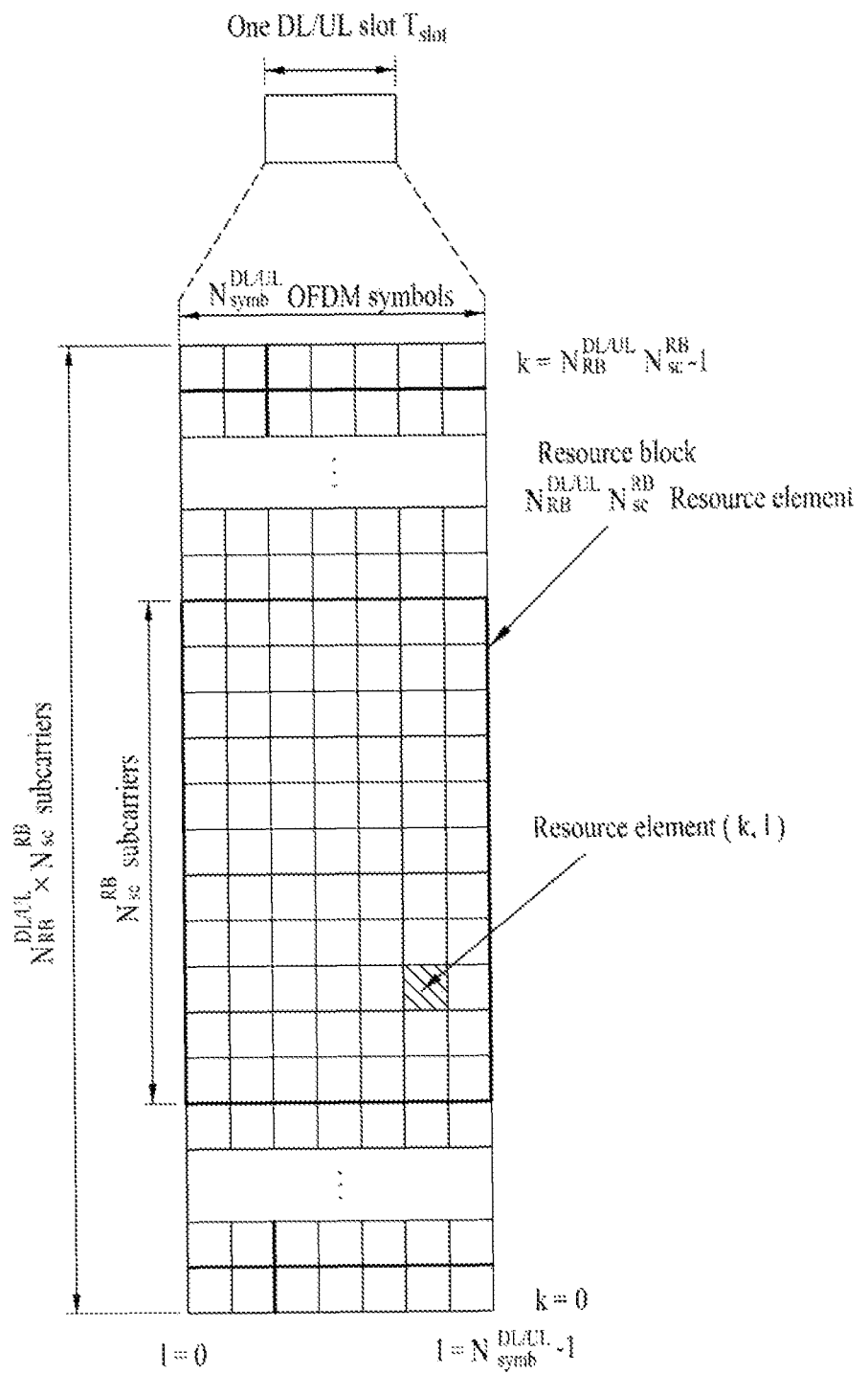
FIG. 2 illustrates an exemplary structure of a Downlink/Uplink (DL/UL) slot in a wireless communication system.

FIG. 2 illustrates an exemplary structure of a DL/UL slot in a wireless communication system. Specifically, FIG. 2 illustrates the structure of a resource grid in the 3 GPP LTE/LTE-A system. There is one resource grid per antenna port.

A slot includes a plurality of OFDM symbols in the time domain by a plurality of Resource Blocks (RBs) in the frequency domain. An OFDM symbol means one symbol period. Referring to FIG. 2, a signal transmitted in each slot may be represented as a resource grid including $N^{DL/UL}_{symb}$ OFDM symbols by $N^{DL/UL}_{RB} \times N^{RB}_{SC}$ subcarriers. $N^{DL}_{RB}$ represents the number of RBs in a DL slot and $N^{UL}_{RB}$ represents the number of RBs in a UL slot. $N^{DL}_{RB}$ and $N^{UL}_{RB}$ depend on a DL transmission bandwidth and a UL transmission bandwidth, respectively. $N^{DL}_{symb}$ represents the number of OFDM symbols in the DL slot and $N^{UL}_{symb}$ represents the number of OFDM symbols in the UL slot. $N^{RB}_{SC}$ represents the number of subcarriers in one RB.

An OFDM symbol may be referred to as an OFDM symbol, an SC-FDMA symbol, etc. according to multiple access schemes. The number of OFDM symbols included in one slot may vary depending on a channel bandwidth and a Cyclic Prefix (CP) length. For example, one slot includes 7 OFDM symbols in the case of normal CP, whereas one slot includes 6 OFDM symbols in the case of extended CP. While one subframe is shown in FIG. 2 as including 7 OFDM symbols in each slot for the convenience of description, the embodiments of the present invention are applicable to a subframe including a different number of OFDM symbols. Referring to FIG. 2, each OFDM symbol includes $N^{DL/UL}_{RB} \times N^{RB}_{SC}$ subcarriers in the frequency domain. Subcarriers may be categorized into data subcarrier for data transmission, RS subcarrier for RS transmission, and null subcarrier for a guard band and a Direct Current (DC) component. The null subcarrier for the DC component is an unused subcarrier mapped to a carrier frequency f0 during OFDM signal generation or frequency upconversion. The carrier frequency is also called a center frequency.

An RB is defined as $N^{DL/UL}_{symb}$ (e.g., 7) consecutive OFDM symbols in the time domain by $N^{RB}_{SC}$ (e.g., 12) consecutive subcarriers in the frequency domain. For reference, a resource including one OFDM symbol by one subcarrier is called an RE or a tone. Therefore, one RB includes $N^{DL/UL}_{symb} \times N^{RB}_{SC}$ REs. Each RE of a resource grid may be uniquely identified by an index pair (k, 1) in a slot. Herein, k represents an index ranging from 0 to $N^{DL/UL}_{RB} \times N^{RB}_{SC}-1$ in the frequency domain and 1 represents an index ranging from 0 to $N^{DL/UL}_{symb}-1$ in the time domain.

Two RBs, each located in one of the two slots of a subframe and occupying the same $N^{RB}_{SC}$ consecutive subcarriers in the subframe are called a Physical Resource Block (PRB) pair.

The two RBs of a PRB pair have the same PRB number (or PRB index). A Virtual RB (VRB) is a logical resource allocation unit, which is introduced for resource allocation. A VRB is equal to a PRB in size. Two types of VRBs are defined, Localized VRB (LVRB) and Distributed VRB (DVRB) according to how VRBs are mapped to PRBs. LVRBs are mapped directly to PRBs and thus VRB numbers (or VRB indexes) are PRB numbers. That is, nPRB=nVRB. The LVRBs are numbered from 0 to NDLVRB−1 and NDLVRB=NDLRB. Therefore, according to the localized mapping, VRBs having the same VRB number are mapped to PRBs having the same PRB number in the first and second slots of a subframe. On the contrary, DVRBs are mapped to PRBs after interleaving. Accordingly, DVRBs having the same VRB number may be mapped to PRBs having different PRB numbers in the first and second slots of a subframe. Two PRBs having the same VRB number, each in one of the two slots of a subframe, is called a VRB pair.

Figure 3:
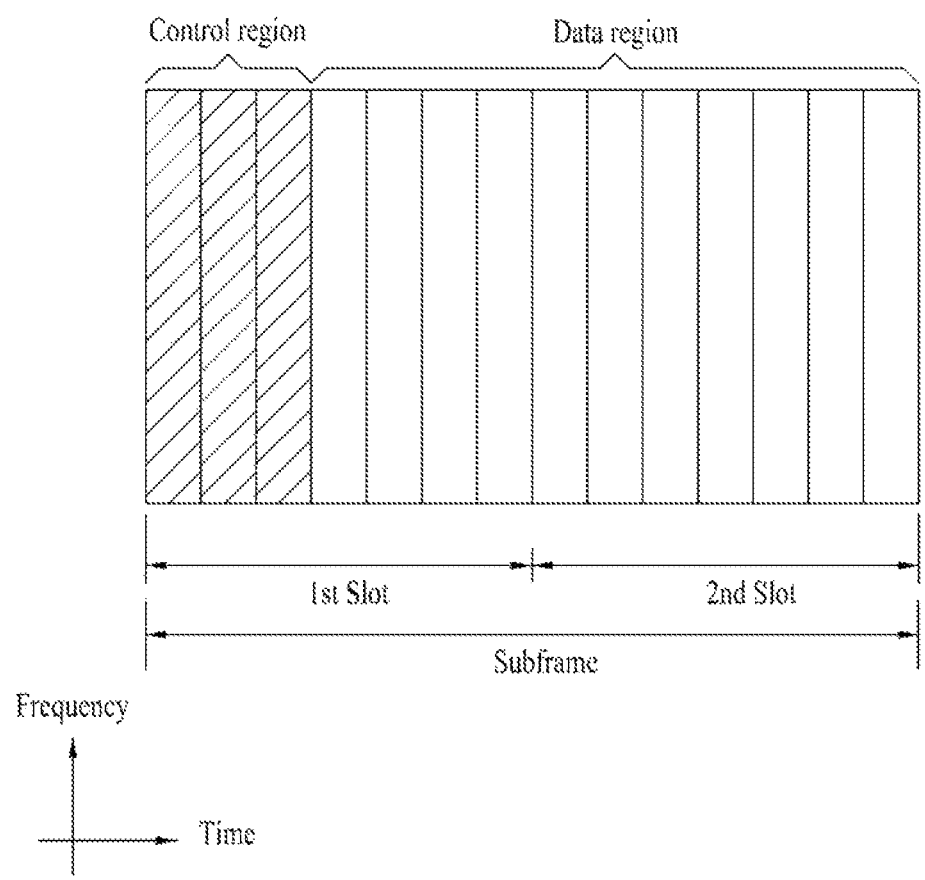
FIG. 3 illustrates an exemplary structure of a DL subframe in a 3$^{rd}$ Generation Partnership project (3GPP) Long Term Evolution (LTE)/LTE-Advanced (LTE-A) system.

FIG. 3 illustrates the structure of a DL subframe in the 3GPP LTE/LTE-A system.

A DL subframe is divided into a control region and a data region in the time domain. Referring to FIG. 3, up to 3 (or 4) OFDM symbols at the start of the first slot of a DL subframe are used as a control region to which control channels are allocated. Hereinafter, a resource area available for PDCCH transmission in a DL subframe is referred to as a PDCCH region. The other OFDM symbols of the DL subframe except for the OFDM symbol(s) of the control region are used as a data region to which a PDSCH is allocated. Hereinafter, a resource area available for PDSCH transmission in a DL subframe is referred to as a PDSCH region. DL control channels defined for the 3GPP LTE system include PCFICH, PDCCH, PHICH, etc. The PCFICH is transmitted in the first OFDM symbol of a subframe, carrying information about the number of OFDM symbols used for transmission of control channels in the subframe. The PHICH delivers a Hybrid Automatic Repeat and reQuest (HARQ) ACK/NACK signal as a response to a UL transmission.

Control information delivered on the PDCCH is called DCI. The DCI transports resource allocation information and other control information for a UE or a UE group. For example, the DCI includes information about resource allocation and a transport format for a Downlink Shared Channel (DL-SCH), information about resource allocation and a transport format for an Uplink Shared Channel (UL-SCH), paging information on a Paging Channel (PCH), system information on the DL-SCH, information about resource allocation for a higher-layer control message such as a random access response transmitted on the PDSCH, a set of transmission power control commands for individual UEs of a UE group, a transmission power control command, Voice Over Internet Protocol (VoIP) activation indication information, etc. DCI delivered on a PDCCH has a different size and usage depending on its DCI format. The size of the DCI may vary with a coding rate.

A plurality of PDCCHs may be transmitted in the PDCCH region of a DL subframe. A UE may monitor a plurality of PDCCHs. A BS determines a DCI format according to DCI to be transmitted to a UE and adds a Cyclic Redundancy Check (CRC) to the DCI. The CRC is masked (or scrambled) by an Identifier (ID) (e.g., Radio Network Temporary Identifier (RNTI)) according to the owner or usage of a PDCCH. If the PDCCH is destined for a specific UE, the CRC may be masked by a Cell RNTI (C-RNTI) of the UE. If the PDCCH is for a paging message, the CRC of the PDCCH may be masked by a Paging RNTI (P-RNTI). If the PDCCH carries system information (particularly, a System Information Block (SIB)), its CRC may be masked by a System Information RNTI (SI-RNTI). If the PDCCH is for a random access response, the CRC of the PDCCH may be masked by a Random Access RNTI (RA-RNTI). CRC masking (or scrambling) includes, for example, XOR-operation of a CRC and an RNTI at a bit level.

A PDCCH is transmitted in an aggregate of one or more consecutive Control Channel Elements (CCEs). A CCE is a logical allocation unit used to provide a coding rate to the PDCCH based on a radio channel state. A CCE includes a plurality of Resource Element groups (REGs). For example, one CCE includes 9 REGs, each REG having 4 REs. 4 Quadrature Phase Shift Keying (QPSK) symbols are mapped to each REG. An RE occupied by an RS is excluded from an REG. Therefore, the number of REGs in a given OFDM symbol varies depending on the presence or absence of an RS. The concept of REG is also applied to other DL control channels (i.e. PCFICH and PHICH). A DCI format and the number of DCI bits are determined according to the number of CCEs.

CCEs are numbered and used consecutively. To simplify a decoding process, a PDCCH configured in a format including n CCEs may start only in a CCE having a number being a multiple of n. A BS determines the number of CCEs, that is, a CCE aggregation level used for transmission of a specific PDCCH according to a channel state. For example, one CCE may be sufficient for a PDCCH directed to a UE having a good DL channel (e.g., a UE near to the BS). However, 8 CCEs may be required for a PDCCH directed to a UE having a poor channel (e.g., a UE at a cell edge) in order to ensure robustness.

Figure 4:
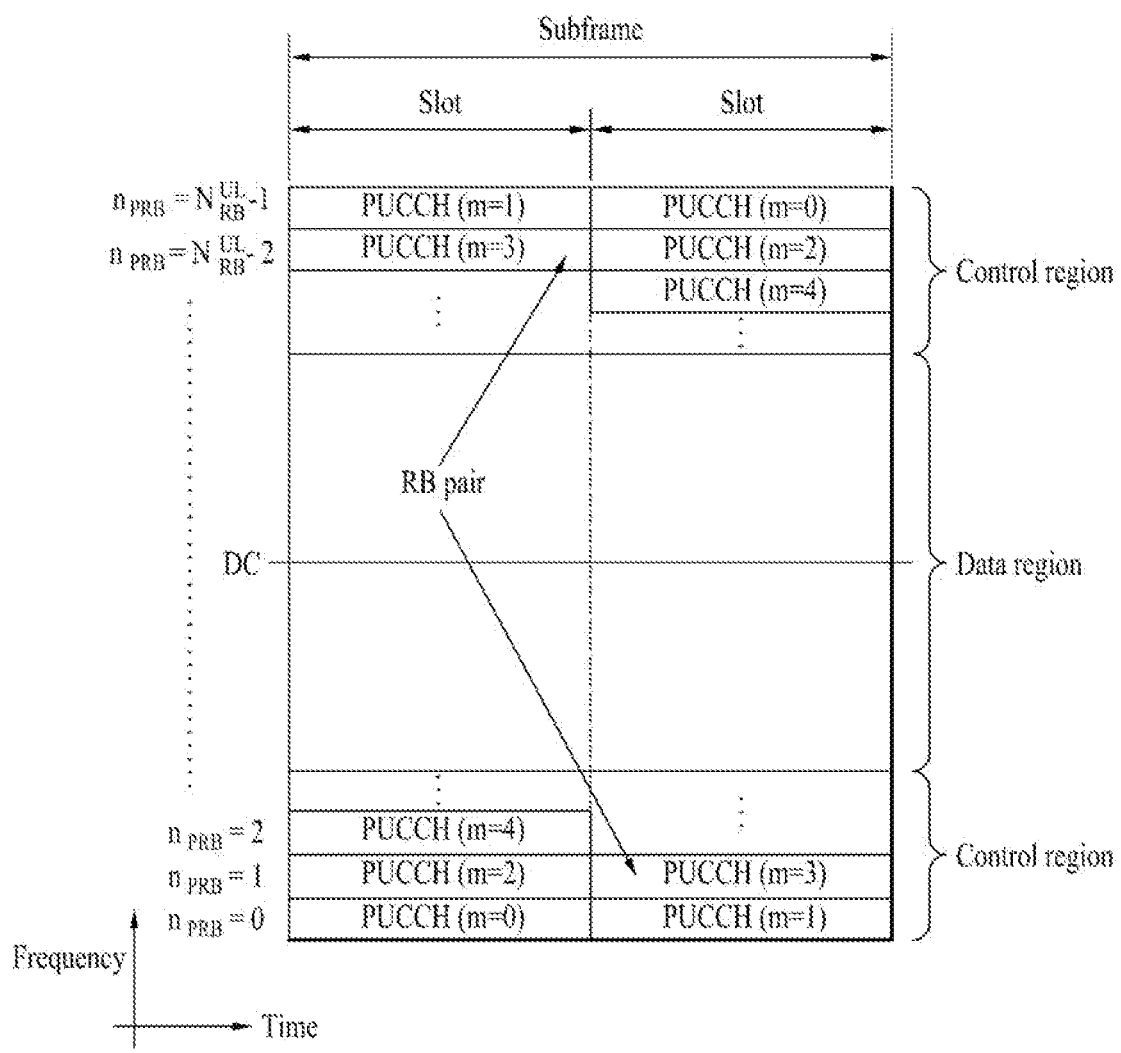
FIG. 4 illustrates an exemplary structure of a UL subframe in the 3GPP LTE/LTE-A system.

FIG. 4 illustrates an exemplary structure of a UL subframe in the 3GPP LTE/LTE-A system.

Referring to FIG. 4, a UL subframe may be divided into a control region and a data region in the frequency domain. One or more PUCCHs carrying UCI may be allocated to the control region and one or more PUSCHs carrying user data may be allocated to the data region. The control region and the data region of the UL subframe are referred to as a PUCCH region and a PUSCH region, respectively. An SRS may also be allocated to the data region. The SRS is transmitted in the last OFDM symbol of the UL subframe in the time domain and in a data transmission band, that is, the data region of the UL subframe in the frequency domain. SRSs that a plurality of UEs transmit in the last OFDM symbol of the same subframe may be distinguished from one another by frequency positions/sequences.

If a UE adopts SC-FDMA for UL transmission, the UE may not transmit a PUCCH and a PUSCH simultaneously on one carrier in a 3GPP LTE release 8 or release 9 system in order to maintain a single carrier property. In a 3GPP LTE release 10 system, a higher layer may indicate whether simultaneous transmission of a PUCCH and a PUSCH is supported.

In the UL subframe, subcarriers remote from a DC subcarrier are used as the control region. In other words, subcarriers at both ends of a UL transmission bandwidth are allocated for transmission of UCI. The DC subcarrier is a component unused for signal transmission and mapped to a carrier frequency f0 during frequency upconversion. A PUCCH for a UE is allocated to an RB pair belonging to resources operated in a carrier frequency in a subframe and the RBs of the RB pair occupy different subcarriers in the two slots of the subframe. It is said that an RB pair allocated to a PUCCH frequency-hops over a slot boundary. If frequency hopping is disabled, the RB pair occupies the same subcarriers.

The size and usage of UCI delivered on a PUCCH are different according to the format of the PUCCH. The size of the UCI may vary with a coding rate. For example, the following PUCCH formats may be defined.

TABLE 2

| PUCCH format | Modulation scheme | Number of bits per subframe, $M_{bit}$ | Usage | Etc. |
|---|---|---|---|---|
| 1 | N/A | N/A | SR (Scheduling Request) | |
| 1a | BPSK | 1 | ACK/NACK or SR + ACK/NACK | One codeword |
| 1b | QPSK | 2 | ACK/NACK or SR + ACK/NACK | Two codeword |
| 2 | QPSK | 20 | CQI/PMI/RI | Joint coding ACK/NACK (extended CP) |
| 2a | QPSK + BPSK | 21 | CQI/PMI/RI + ACK/NACK | Normal CP only |
| 2b | QPSK + QPSK | 22 | CQI/PMI/RI + ACK/NACK | Normal CP only |
| 3 | QPSK | 48 | ACK/NACK or SR + ACK/NACK or CQI/PMI/RI + ACK/NACK | |

Referring to [Table 2], a PUCCH format 1 series and a PUCCH format 3 series are mainly used to transmit ACK/NACK information, whereas a PUCCH format 2 series is mainly used to carry Channel State Information (CSI) such as a Channel Quality Indicator (CQI)/Precoding Matrix Index (PMI)/Rank Indicator (RI).

A BS allocates PUCCH resources for UCI transmission to a UE by a higher-layer signal, a dynamic control signal, or implicitly. Physical resources used for a PUCCH depend on two parameters indicated by a higher layer, N(2)RB and N(1)cs. The parameter N(2)RB, which is equal to or greater than 0 (N(2)RB≥0), indicates an available bandwidth for PUCCH format 2/2a/2b transmission in each slot and is expressed as an integer multiple of NRBsc. The parameter N(1)cs indicates the number of Cyclic Shifts (CSs) used for PUCCH format 1/1a/1b in an RB used for a mixture of format 1/1a/1b and format 2/2a/2b. A value of N(1)cs is an integer multiple of ΔPUCCHshift within a range of {0, 1, . . . , 7}. ΔPUCCHshift is provided by a higher layer. If N(1)cs is 0, no mixed RBs are present. No more than one RB supports a mixture of PUCCH format 1/1a/1b and PUCCH format 2/2a/2b in each slot. Resources used for transmission of PUCCH format 1/1a/1b, PUCCH format 2/2a/2b, and PUCCH format 3 through antenna port p are expressed as n(1, p)PUCCH, n(2, p)PUCCH<N(2)RBNRBSC+ceil(N(1)cs/8)(NRBsc−N(1)cs−2) and n(2, p)PUCCH, respectively, which are indexes being non-negative integers.

More specifically, an orthogonal sequence and/or a CS to be applied to UCI is determined from a PUCCH resource index according to a predetermined rule for each PUCCH format and resource indexes of two RBs in a subframe, to which a PUCCH is to be mapped, are given. For example, a PRB for PUCCH transmission in slot ns is given as follows.

$$n_{PRB} = \begin{cases} \left\lfloor \frac{m}{2} \right\rfloor & \text{if } (m+n_s \bmod 2) \bmod 2 = 0 \\ N_{RB}^{UL} - 1 - \left\lfloor \frac{m}{2} \right\rfloor & \text{if } (m+n_s \bmod 2) \bmod 2 = 1 \end{cases}$$ [Equation 1]

In [Equation 1], a variable m depends on a PUCCH format and is given as [Equation 2], [Equation 3], and [Equation 4] for PUCCH format 1/1a/1b, PUCCH format 2/2a/2b, and PUCCH format 3, respectively.

$$m = \begin{cases} N_{RB}^{(2)} & \text{if } n_{PUCCH}^{(1,p)} < c \cdot N_{cs}^{(1)}/\Delta_{shift}^{PUCCH} \\ \left\lfloor \dfrac{n_{PUCCH}^{(1,\tilde{p})} - c \cdot N_{cs}^{(1)}/\Delta_{shift}^{PUCCH}}{c \cdot N_{sc}^{RB}/\Delta_{shift}^{PUCCH}} \right\rfloor + N_{RB}^{(2)} + \left\lceil \dfrac{N_{cs}^{(1)}}{8} \right\rceil & \text{otherwise} \end{cases}$$ [Equation 2]

$$c = \begin{cases} 3 & \text{normal cyclic prefix} \\ 2 & \text{extended cyclic prefix} \end{cases}$$

In [Equation 2], n(1, p)PUCCH represents a PUCCH resource index of antenna port p for PUCCH format 1/1 a/1b. In the case of an ACK/NACK PUCCH, n(1, p)PUCCH is a value implicitly determined by the first CCE index of a PDCCH carrying scheduling information for a corresponding PDSCH.

$$m = \lfloor n_{PUCCH}^{(2,\tilde{p})}/N_{SC}^{RB} \rfloor$$ [Equation 3]

In [Equation 3], n(2)PUCCH represents a PUCCH resource index of antenna port p for PUCCH format 2/2a/2b and is a value that a BS transmits to a UE by higher-layer signaling.

$$m = \lfloor n_{PUCCH}^{(3,\tilde{p})}/N_{SC,0}^{PUCCH} \rfloor$$ [Equation 4]

In [Equation 4], n(3)PUCCH represents a PUCCH resource index of antenna port p for PUCCH format 3 and is a value that a BS transmits to a UE by higher-layer signaling. NPUCCHSF,0 is a spreading factor for the first slot of a subframe. For both slots of a subframe using normal PUCCH format 3, NPUCCHSF,0 is 5. For the first and second slots of a subframe using reduced PUCCH format 3, NPUCCHSF,0 is 5 and 4, respectively.

Referring to [Equation 2], PUCCH resources for an ACK/NACK are not pre-allocated to each UE. Rather, a plurality of PUCCH resources are divided for a plurality of UEs within a cell at each time point. Specifically, PUCCH resources that a UE uses to transmit an ACK/NACK is determined dynamically based on a PDCCH carrying scheduling information for a PDSCH carrying corresponding DL data. A whole area of each DL subframe in which PDCCHs are transmitted includes a plurality of CCEs and a PDCCH transmitted to a UE includes one or more CCEs. The UE transmits an ACK/NACK in a PUCCH resource linked to a specific CCE (e.g., the first CCE) among the CCEs of a PDCCH that the UE has received. Hereinafter, a PUCCH resource which is linked to a PDCCH and determined dynamically will be referred to as an ACK/NACK PUCCH resource.

An ACK/NACK is feedback control information that a receiver transmits to a transmitter according to whether data transmitted by the transmitter has been decoded successfully at the receiver. For example, when a UE succeeds in decoding DL data, the UE may feed back ACK information to a BS and otherwise, the UE may feed back NACK information to the BS. Specifically, the receiver may need to transmit an ACK/NACK largely in the following three cases in the LTE system.

First, the receiver transmits an ACK/NACK for a PDSCH transmission indicated by a detected PDCCH. Second, the receiver transmits an ACK/NACK for a PDCCH indicating Semi-Persistent Scheduling (SPS) release. Third, the receiver transmits an ACK/NACK for a PDSCH that has been transmitted without PDCCH detection. This means transmission of an ACK/NACK for SPS. Unless otherwise specified, the ACK/NACK transmission scheme is not limited to any specific one of the three cases.

Figure 5:
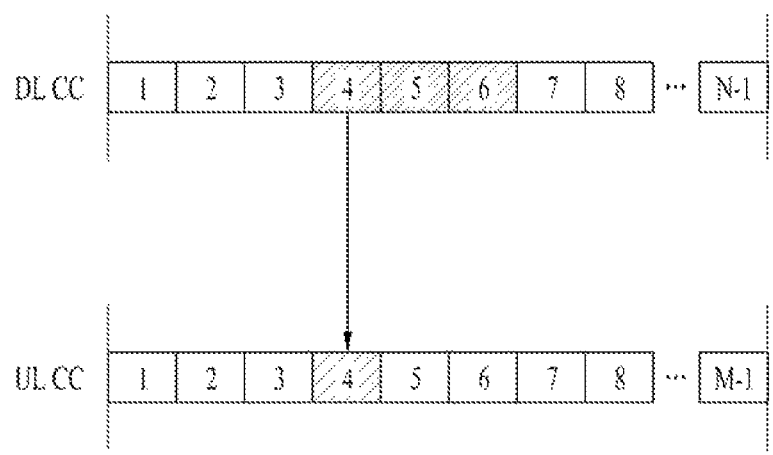
FIG. 5 illustrates an exemplary allocation of ACKnowledgment/Negative ACKnowledgment (ACK/NACK) resources in the 3GPP LTE/LTE-A system.

FIG. 5 illustrates a resource in which an ACK/NACK is transmitted for a PDSCH. In FIG. 5, each square in a DL CC represents a CCE and each square in a UL CC represents a PUCCH. As illustrated in FIG. 5, for example, it may be assumed that a UE acquires PDSCH-related information on a PDCCH including CCEs 4, 5, and 6 and receives a PDSCH based on the acquired information. In this case, the UE may transmit ACK/NACK information for the PDSCH on a PUCCH linked to the first CCE of the PDCCH that schedules the PDSCH, that is, PUCCH 4. FIG. 5 illustrates an exemplary case in which given up to N CCEs for a DL CC, up to M PUCCHs exist in a UL CC. Although N may be equal to M (N=M), it is possible to set M to be different from N and map CCEs to PUCCHs in an overlapped manner.

In an FDD system, a UE may transmit HARQ ACK/NACK information in subframe n in response to a PDSCH received in subframe (n−k) (e.g., k=4 in the LTE system). The UE may determine the index of a PUCCH resource in which it will transmit the HARQ ACK/NACK in subframe n from a PDCCH indicating the PDSCH transmission in subframe (n−k).

For example, the index of a PUCCH resource is determined by [Equation 5] in the LTE system.

$$n^{(1)}_{PUCCH} = n_{CCE} + N^{(1)}_{PUCCH}$$ [Equation 5]

In [Equation 5], $n^{(1)}_{PUCCH}$ represents a resource index of PUCCH format 1, ACK/NACK transmission, $N^{(1)}_{PUCCH}$ represents a signaling value received from a higher layer, and $n_{CCE}$ is the smallest of CCE indexes used for PDCCH transmission. A CS value, an orthogonal spreading code, and a PRB for PUCCH format 1a/1b are acquired from $n^{(1)}_{PUCCH}$.

Referring to FIG. 5, each PUCCH resource index indicates a PUCCH resource in which an ACK/NACK will be transmitted. As illustrated in FIG. 5, if a PDCCH including CCEs 4, 5, and 6 delivers scheduling information for a PDSCH to a UE and CCE 4 is linked to PUCCH resource index 4, the UE transmits an ACK/NACK to a BS in PUCCH resource 4 linked to CCE 4 of the PDCCH. Specifically, PUCCH resource indexes for transmission through two antenna ports p0 and p1 are determined as follows in the 3GPP LTE/LTE-A system.

$$n_{PUCCH}^{(1,\tilde{p}=p0)} = n_{CCE} + N_{PUCCH}^{(1)}$$ [Equation 6]

$$n_{PUCCH}^{(1,\tilde{p}=p1)} = n_{CCE} + 1 + N_{PUCCH}^{(1)}$$ [Equation 7]

Herein, n(1, p=p0)PUCCH represents the index (i.e. number) of an ACK/NACK PUCCH resource to be used for antenna port p0, n(1, p=p1)PUCCH represents the index of an ACK/NACK PUCCH resource to be used for antenna port p1, $N^{(1)}_{PUCCH}$ represents a signaling value received from a higher layer, and $n_{CCE}$ is the smallest of CCE indexes used for PDCCH transmission. For example, for a CCE aggregation level of 2 or larger, the first of the indexes of a plurality of CCEs aggregated for PDCCH transmission is used in determining an ACK/NACK PUCCH resource.

Now, ACK/NACK transmission in the TDD mode will be described.

In the TDD mode, since DL transmission and UL transmission are distinguished from each other by time, the subframes of a radio frame are divided into DL subframes and UL subframes. For UL-DL configurations in the TDD mode, refer to [Table 1].

In a TDD system, a UE may transmit ACK/NACK information for a PDSCH received in one or more DL subframes in one UL subframe. The UE may transmit HARQ ACK/NACK information in UL subframe n for a PDSCH received in DL subframe (n−k) and k may be given according to a UL-DL configuration. For example, for UL-DL configurations listed in [Table 3], a set of DL-related indexes $K^{\{k_0, k_1, \ldots k_{M-1}\}}$ may be given as illustrated in [Table 4].

TABLE 3

| UL-DL Config- | Subframe n | | | | | | | | | |
|---|---|---|---|---|---|---|---|---|---|---|
| uration | 0 | 1 | 2 | 3 | 4 | 5 | 6 | 7 | 8 | 9 |
| 0 | — | — | 6 | — | 4 | — | — | 6 | — | 4 |
| 1 | — | — | 7, 6 | 4 | — | — | — | 7, 6 | 4 | — |
| 2 | — | — | 8, 7, 4, 6 | — | — | — | — | 8, 7, 4, 6 | — | — |
| 3 | — | — | 7, 6, 11 | 6, 5 | 5, 4 | — | — | — | — | — |
| 4 | — | — | 12, 8, 7, 11 | 6, 5, 4, 7 | — | — | — | — | — | — |
| 5 | — | — | 13, 12, 9, 8, 7, 5, 4, 11, 6 | — | — | — | — | — | — | — |
| 6 | — | — | 7 | 7 | 5 | — | — | 7 | 7 | — |

For example, in the case of UL-DL configuration 0 given in the above table, k is 4 for UL subframe 9. Thus, ACK/NACK information for data received in DL subframe 5 (=9−4) may be transmitted in UL subframe 9. A detailed description will be given of a method for determining a PUCCH resource index for ACK/NACK transmission in the TDD system.

First of all, the number of elements in the set $K^{\{k_0, k_1, \ldots k_{M-1}\}}$ is given as M in [Table 2]. For example, the number of elements in the set K is 1 for subframe 2 in UL-DL configuration 0 and 4 for subframe 2 in UL-DL configuration 2.

For TDD ACK/NACK bundling or multiplexing in subframe n with M=1, a UE may determine a PUCCH resource $n^{(1)}_{PUCCH}$ for HARQ ACK/NACK transmission in subframe n in the following manner.

If a PDCCH indicating PDSCH transmission or SPS release exists in subframe (n−k) (k∈K), the UE selects p satisfying $N_p \leq n_{CCE} < N_{p+1}$ from among {0, 1, 2, 3}. A PUCCH resource index $n^{(1)}_{PUCCH}$ may be determined by [Equation 8]

$$n_{PUCCH}^{(1)} = (M-1) \times N_p + m \times N_{p-1} + n_{CCE} + N_{PUCCH}^{(1)}$$ [Equation 8]

In [Equation 8], $n^{(1)}_{PUCCH}$ represents a resource index of PUCCH format 1, for ACK/NACK transmission, $N^{(1)}_{PUCCH}$ represents a signaling value received from a higher layer, $n_{CCE}$ is the smallest of CCE indexes used for PDCCH transmission in subframe (n−km) (km is the smallest value in the set K). $N_p$ may be determined by the following equation.

$$N_p = \max\{0, \lfloor [N_{RB}^{DL} \times (N_{sc}^{RB} \times p - 4)]/36 \rfloor\}$$ [Equation 9]

In [Equation 9], $N_{RB}^{DL}$ represents a DL bandwidth in units of $N_{sc}^{RB}$ which is the size of an RB in the frequency domain, expressed as the number of subcarriers.

If a PDSCH transmission is scheduled in subframe (n−k) (k∈K) without a PDCCH indicating the PDSCH transmission, the value of $n^{(1)}_{PUCCH}$ may be determined by a higher layer.

Meanwhile, for TDD ACK/NACK multiplexing in subframe n with M>1, the UE may determine a PUCCH resource for HARQ ACK/NACK transmission in the following manner. In the following description, $n^{(1)}_{PUCCH,i}(0\leq i\leq M-1)$ is referred to as an ACK/NACK resource related to subframe $(n-k_i)$ and HARQ-ACK(i) is referred to as an ACK/NACK response related to subframe $(n-k_i)$.

If a PDCCH indicating PDSCH transmission or SPS release exists in subframe $(n-k_i)$ ($k \in K$), an ACK/NACK resource $n^{(1)}_{PUCCH,i}$ a may be determined by $$n_{PUCCH,i}^{(1)}=(M-i-1)\times N_p+i\times N_{p+1}+n_{CCE,i}+N_{PUCCH}^{(1)} \quad \text{[Equation 10]}$$

In [Equation 10], $N^{(1)}_{PUCCH}$ represents a signaling value received from a higher layer and $n_{CCE,i}$ is the smallest of CCE indexes used for PDCCH transmission in subframe p is selected from among $\{0, 1, 2, 3\}$, satisfying $N_p \leq n_{CCE,i} < N_{p+1}$. Np may be determined by [Equation 9].

If a PDSCH transmission is scheduled in subframe $(n-k_i)$ ($k_t \in K$) without a PDCCH indicating the PDSCH transmission, may be determined by the higher layer.

The UE transmits bits b(0) and b(1) in an ACK/NACK resource $n^{(1)}_{PUCCH}$ of subframe n using PUCCH format 1b. Values of the bits b(0) and b(1) and the ACK/NACK resource $n^{(1)}_{PUCCH}$ may be generated by channel selection in [Table 5], [Table 6], and [Table 7]. [Table 5], [Table 6], and [Table 7] are for transmission by ACK/NACK multiplexing, respectively for M=2, M=3, and M=4. If the bits b(0) and b(1) are mapped to N/A, the UE does not transmit an ACK/NACK response in subframe n.

TABLE 5

| HARQ-ACK(0), HARQ-ACK(1) | $n^{(1)}_{PUCCH}$ | b(0), b(1) |
|---|---|---|
| ACK, ACK | $n^{(1)}_{PUCCH,1}$ | 1, 1 |
| ACK, NACK/DTX | $n^{(1)}_{PUCCH,0}$ | 0, 1 |
| NACK/DTX, ACK | $n^{(1)}_{PUCCH,1}$ | 0, 0 |
| NACK/DTX, NACK | $n^{(1)}_{PUCCH,1}$ | 1, 0 |
| NACK, DTX | $n^{(1)}_{PUCCH,0}$ | 1, 0 |
| DTX, DTX | N/A | N/A |

TABLE 6

| HARQ-ACK(0), HARQ-ACK(1), HARQ-ACK(2) | $n^{(1)}_{PUCCH}$ | b(0), b(1) |
|---|---|---|
| ACK, ACK, ACK | $n^{(1)}_{PUCCH,2}$ | 1, 1 |
| ACK, ACK, NACK/DTX | $n^{(1)}_{PUCCH,1}$ | 1, 1 |
| ACK, NACK/DTX, ACK | $n^{(1)}_{PUCCH,0}$ | 1, 1 |
| ACK, NACK/DTX, NACK/DTX | $n^{(1)}_{PUCCH,0}$ | 0, 1 |
| NACK/DTX, ACK, ACK | $n^{(1)}_{PUCCH,2}$ | 1, 0 |
| NACK/DTX, ACK, NACK/DTX | $n^{(1)}_{PUCCH,1}$ | 0, 0 |
| NACK/DTX, NACK/DTX, ACK | $n^{(1)}_{PUCCH,2}$ | 0, 0 |
| DTX, DTX, NACK | $n^{(1)}_{PUCCH,2}$ | 0, 1 |
| DTX, NACK, NACK/DTX | $n^{(1)}_{PUCCH,1}$ | 1, 0 |
| NACK, NACK/DTX, NACK/DTX | $n^{(1)}_{PUCCH,0}$ | 1, 0 |
| DTX, DTX, DTX | N/A | N/A |

TABLE 7

| HARQ-ACK(0), HARQ-ACK(1), HARQ-ACK(2), HARQ-ACK(3) | $n^{(1)}_{PUCCH}$ | b(0), b(1) |
|---|---|---|
| ACK, ACK, ACK, ACK | $n^{(1)}_{PUCCH,1}$ | 1, 1 |
| ACK, ACK, ACK, NACK/DTX | $n^{(1)}_{PUCCH,1}$ | 1, 0 |
| NACK/DTX, NACK/DTX, NACK, DTX | $n^{(1)}_{PUCCH,2}$ | 1, 1 |
| ACK, ACK, NACK/DTX, ACK | $n^{(1)}_{PUCCH,1}$ | 1, 0 |
| NACK, DTX, DTX, DTX | $n^{(1)}_{PUCCH,0}$ | 1, 0 |
| ACK, ACK, NACK/DTX, NACK/DTX | $n^{(1)}_{PUCCH,1}$ | 1, 0 |
| ACK, NACK/DTX, ACK, ACK | $n^{(1)}_{PUCCH,3}$ | 0, 1 |
| NACK/DTX, NACK/DTX, NACK/DTX, NACK | $n^{(1)}_{PUCCH,3}$ | 1, 1 |
| ACK, NACK/DTX, ACK, NACK/DTX | $n^{(1)}_{PUCCH,2}$ | 0, 1 |
| ACK, NACK/DTX, NACK/DTX, ACK | $n^{(1)}_{PUCCH,0}$ | 0, 1 |
| ACK, NACK/DTX, NACK/DTX, NACK/DTX | $n^{(1)}_{PUCCH,0}$ | 1, 1 |
| NACK/DTX, ACK, ACK, ACK | $n^{(1)}_{PUCCH,3}$ | 0, 1 |
| NACK/DTX, NACK, DTX, DTX | $n^{(1)}_{PUCCH,1}$ | 0, 0 |
| NACK/DTX, ACK, ACK, NACK/DTX | $n^{(1)}_{PUCCH,2}$ | 1, 0 |
| NACK/DTX, ACK, NACK/DTX, ACK | $n^{(1)}_{PUCCH,3}$ | 1, 0 |
| NACK/DTX, ACK, NACK/DTX, NACK/DTX | $n^{(1)}_{PUCCH,1}$ | 0, 1 |
| NACK/DTX, NACK/DTX, ACK, ACK | $n^{(1)}_{PUCCH,3}$ | 0, 1 |
| NACK/DTX, NACK/DTX, ACK, NACK/DTX | $n^{(1)}_{PUCCH,2}$ | 0, 0 |
| NACK/DTX, NACK/DTX, NACK/DTX, ACK | $n^{(1)}_{PUCCH,3}$ | 0, 0 |
| DTX, DTX, DTX, DTX | N/A | N/A |

In [Table 5], [Table 6], and [Table 7], HARQ-ACK(i) represents an HARQ ACK/NACK/DTX result for an $i^{th}$ data unit ($0 \leq i < 3$). Discontinuous Transmission (DTX) means the absence of transmission of a data unit corresponding to HARQ-ACK(i) or a UE's failure in detecting the data unit corresponding to HARQ-ACK(i). HARQ-ACK is interchangeably used with ACK/NACK in the specification. Up to four PUCCH resources (i.e., $n^{(1)}_{PUCCH,0} \sim n^{(1)}_{PUCCH,3}$) may be occupied in relation to each data unit. A multiplexed ACK/NACK is transmitted in one PUCCH resource selected from the occupied PUCCH resources. In [Table 5], [Table 6], and [Table 7], $n^{(1)}_{PUCCH,x}$ represents a PUCCH resource used for actual transmission of an ACK/NACK. b(0) and b(1) are two bits transmitted in the selected PUCCH resource after modulation in QPSK. For example, if the UE succeeds in decoding 4 data units, the UE transmits (1, 1) to the BS in a PUCCH resource linked to $n^{(1)}_{PUCCH,1}$, as illustrated in [Table 5]. Since the combinations of PUCCH resources and QPSK symbols do not represent all possible ACK/NACK hypotheses, NACK and DTX are coupled except for some cases (represented as NACK/DTX).

Coordinated Multiple Point transmission and reception (CoMP) will be described below.

To satisfy enhanced system performance requirements for the 3GPP LTE-A system, CoMP (known as co-MIMO, collaborative MIMO, or network MIMO) has been proposed. The CoMP technology may increase the performance of UEs located at a cell edge and an average sector throughput.

Inter-Cell Interference (ICI) generally degrades the performance of UEs at a cell edge and an average sector throughput in a multi-cellular environment with a frequency reuse factor of 1. To reduce ICI, a legacy LTE system adopts a method for offering an appropriate throughput to a cell-edge UE in an environment constrained by interference, using a simple ICI mitigation technique such as UE-specific power control-based Fractional Frequency Reuse (FFR). However, it may be preferred to reduce ICI or reuse ICI as a UE-desired signal, rather than to decrease the utilization of frequency resources per cell. For this purpose, CoMP transmission techniques may be used.

DL CoMP schemes may be classified largely into Joint Processing (JP) and Coordinated Scheduling/Beamforming (CS/CB).

According to the JP scheme, each point (BS) of a CoMP cooperation unit may use data. The CoMP cooperation unit refers to a set of BSs used for a CoMP transmission operation, also called a CoMP set. The JP scheme is further branched into joint transmission and dynamic cell selection.

Joint transmission is a technique of transmitting PDSCHs from a plurality of points (a part or the whole of a CoMP cooperation unit) at one time. That is, a plurality of transmission points may simultaneously transmit data to a single UE. The joint transmission scheme may improve the quality of a received signal coherently or non-coherently and actively eliminate interference with other UEs, as well.

Dynamic cell selection is a technique of transmitting a PDSCH from one point (of a CoMP cooperation unit) at one time. That is, one point of the CoMP cooperation unit transmits data to a single UE at a given time point, while the other points of the CoMP cooperation unit do not transmit data to the UE at the time point. A transmission point to transmit data to a UE may be dynamically selected.

Meanwhile, in the CS/CB scheme, a CoMP cooperation unit may perform cooperative beamforming for data transmission to a single UE. While only a serving cell transmits data to the UE, user scheduling/beamforming may be determined through coordination among cells of the CoMP cooperation unit.

UL CoMP reception refers to reception of a UL signal through cooperation among a plurality of geographically separate points. UL CoMP schemes include Joint Reception (JR) and Coordinated Scheduling/Beamforming (CS/CB).

In JR, a plurality of reception points receive a signal transmitted on a PUSCH. CS/CB is a technique in which while only one point receives a PUSCH, user scheduling/beamforming is determined through coordination among cells of a CoMP cooperation unit.

A case in which a plurality of UL points (i.e. reception points) exist may be referred to as UL CoMP, and a case in which a plurality of DL points (i.e. transmission points) exist may be referred to as DL CoMP.

Figure 6:
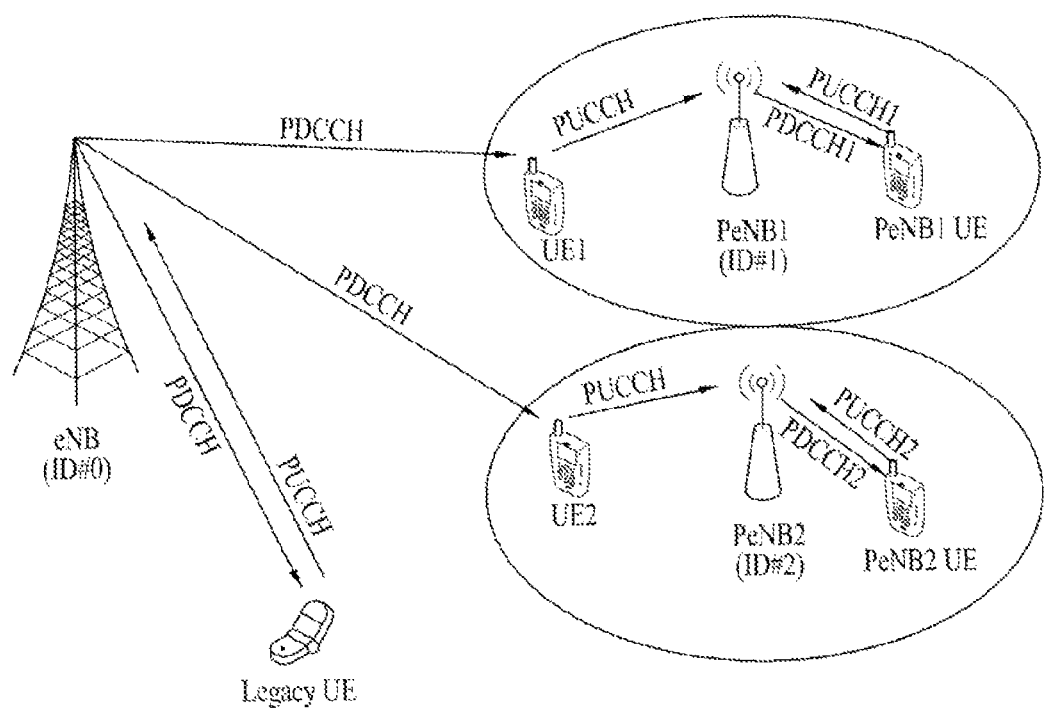
FIG. 6 illustrates a wireless communication environment to which an embodiment of the present invention is applicable.

FIG. 6 illustrates a network configuration for communication based on CoMP transmission and reception according to an embodiment of the present invention. FIG. 6 illustrates a Heterogeneous Network (HetNet) environment in which a CoMP UE is connected to different DL/UL serving cells. While a few eNBs and a few UEs are shown in FIG. 6, more eNBs and more UEs may exist in the network structure.

As described before, PUCCH resources for CoMP UEs, UE1 and UE2 as well as PUCCH resources for a legacy UE are determined based on PDCCHs received from serving cells of the CoMP UEs, UE1 and UE2, particularly the smallest ones of CCE indexes of the PDCCHs. However, to save UL PUCCH transmission power or reduce UL interference with neighbor cells or points, the CoMP UEs, UE1 and UE2 may transmit PUCCHs to pico eNBs, PeNB1 and PeNB2 (other than a UL serving cell, that is, eNB(ID #0)), as illustrated in FIG. 6. Accordingly, the pico eNBs should consider PUCCH resources for the CoMP UEs as well as PUCCH resources for existing serviced pico UEs (PeNB1 UE and PeNB2 UE).

That is, a PUCCH resource for each UE is determined by the afore-defined [Equation 5], [Equation 6], and [Equation 7]. If all UEs connected to one cell or point use the same $N^{(1)}_{PUCCH}$ value, the PUCCH resource may be determined by an $n_{CCE}$ value. However, since a PDCCH that determines the $n_{CCE}$ value is received from a cell or point other than a cell or point that receives a PUCCH, it may occur that the $n_{CCE}$ value is the same, resulting in collision between PUCCH resources. Therefore, there is a need for a method for preventing such a collision. In the example of FIG. 6, it is necessary to avoid collision between PUCCH resources of a CoMP UE and a pico UE. To prevent the collision, the present standard configures $N^{(1)}_{PUCCH}$ UE-specifically. Accordingly, since a different $N^{(1)}_{PUCCH}$ value may be configured for each UE, the UE may use a PUCCH resource distinguishably. This is illustrated in FIG. 7.

Figure 7:
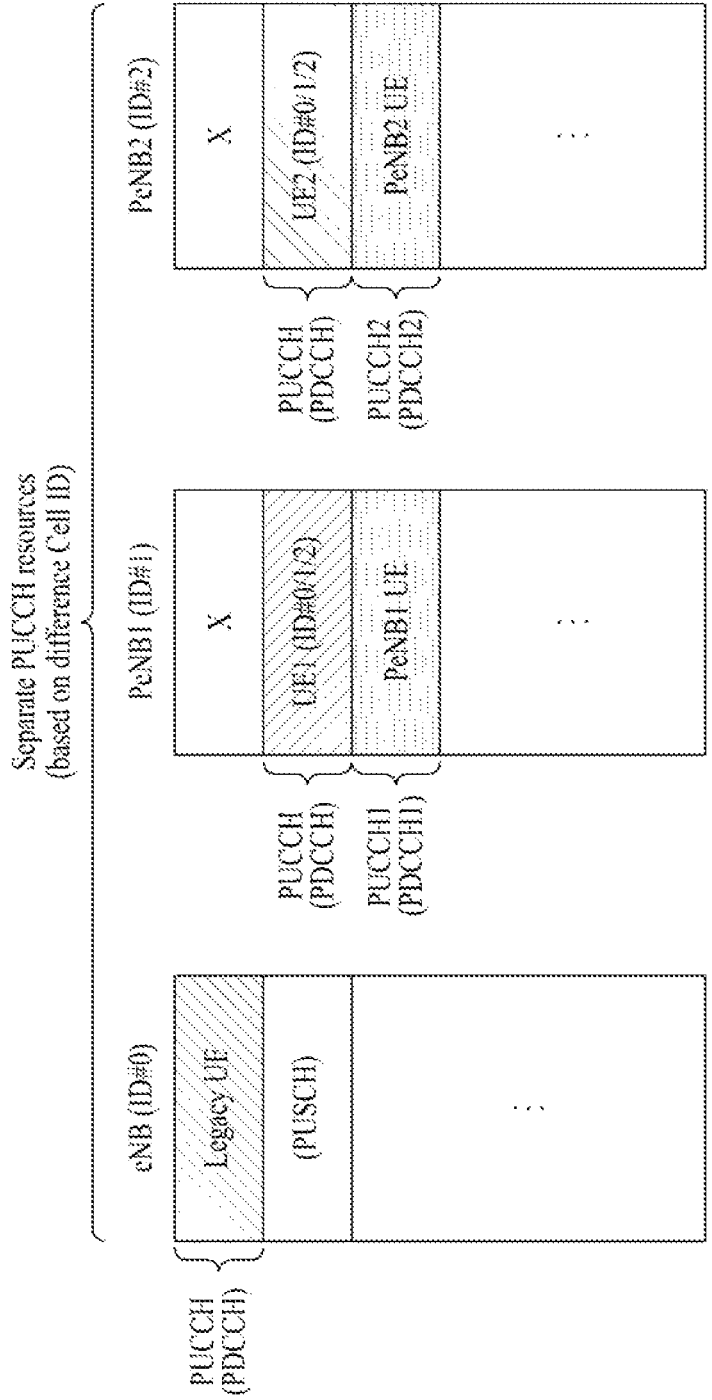
FIG. 7 illustrates an exemplary resource allocation for a UL control channel.

FIG. 7 illustrates an exemplary allocation of PUCCH resources according to an embodiment of the present invention. Since a different PUCCH resource offset $N^{(1)}_{PUCCH}$ may be set for each UE as described before, the range of PUCCH resources for each cell or point is divided according to UEs, thus avoiding collision between PUCCH resources.

A PUCCH resource (hereinafter, referred to as a PUCCH region) of a CoMP UE is determined based on the smallest of CCE indexes of a PDCCH received from a DL serving point by [Equation 5], [Equation 6] and [Equation 7]. Therefore, as many PUCCH regions as a total number of CCE indexes, $N_{CCE}$ at the reception time of the PDCCH from the DL serving point are determined. Thus, the size of a PUCCH region of a legacy UE for the DL serving point and the size of a PUCCH region of a CoMP UE for a specific UL point are both determined by the total number of CCE indexes, $N_{CCE}$ at the reception time of the PDCCH from the DL serving point. As a result, even though a few CoMP UEs barely exist at that time point, excessive PUCCH regions are reserved for a CoMP UE(s), thereby decreasing resource efficiency. For example, if the PUCCH resource determination method based on [Table 5], [Table 6], and [Table 7] is still used in determining a PUCCH resource for a CoMP UE, about 6 to 10% of a whole available PUSCH transmission region of the specific UL point may be reserved as the PUCCH region for the CoMP UE. This is inefficient in terms of resource utilization because UL throughput is reduced in the presence of a small number of CoMP UEs, as described before.

The afore-described PUCCH resource determination method is designed for PUCCH format 1a/1b and PUCCH resources are configured semi-statically for PUCCH format 2/3 by higher-layer signaling, unlike PUCCH format 1a/1b. If PUCCH resource-related information is exchanged between cells or points, PUCCH resources may be shared between a CoMP UE and a legacy UE.

An embodiment of the present invention provides a UE-specific PUCCH resource allocation method other than the conventional PUCCH resource determination method ([Equation 5], [Equation 6], and [Equation 7]) for a PUCCH region separate from an existing PUCCH region configured for a legacy UE, when the separate PUCCH region is additionally allocated for the purpose of CoMP, etc. The PUCCH region additionally allocated for the additional purpose (e.g., for a CoMP UE) will be referred to as a "new PUCCH region" in the specification. As a new compressed PUCCH region is determined or allocated, compared to the conventional PUCCH region determination method, the embodiments of the present invention may increase resource use efficiency. The embodiments of the present invention will be described below in detail.

Embodiment 1

According to an embodiment of the present invention, PUCCH resources are compressed by a specific function so that a plurality of CCE indexes may be mapped to one PUCCH resource index. Examples of the specific function used for the mapping will be described below.

1-1. Example 1

It is proposed that a plurality of CCE indexes $n_{CCE}$ are mapped to one PUCCH resource index by applying a floor function to the CCE indexes $n_{CCE}$. The floor function floor(X) represents a largest integer equal to or less than X. This scheme is expressed as the following equation, for example.

$$n_{PUCCH}^{(1)} = \text{floor}(n_{CCE}/A) + N_{PUCCH\_UE}^{(1)} \quad \text{[Equation 11]}$$

In [Equation 11], $N_{PUCCH\_UE}^{(1)}$ is a UE-specific PUCCH resource offset parameter received by the afore-described higher-layer signaling, indicating a starting point (index) of a new PUCCH region distinguished from a legacy PUCCH region determined based on an existing cell-specific PUCCH resource offset parameter $N_{PUCCH}^{(1)}$. The PUCCH resource indexes $n_{PUCCH}^{(1)}$ of the new PUCCH region are determined to be $N_{PUCCH\_UE}^{(1)}$ plus integers obtained by applying the floor function to $n_{CCE}/A$, starting from $N_{PUCCH\_UE}^{(1)}$. The parameter A may be provided preliminarily by higher-layer signaling and one of a few predetermined A values may be selected. An example for A=3 is illustrated in FIG. 8.

Figure 8:
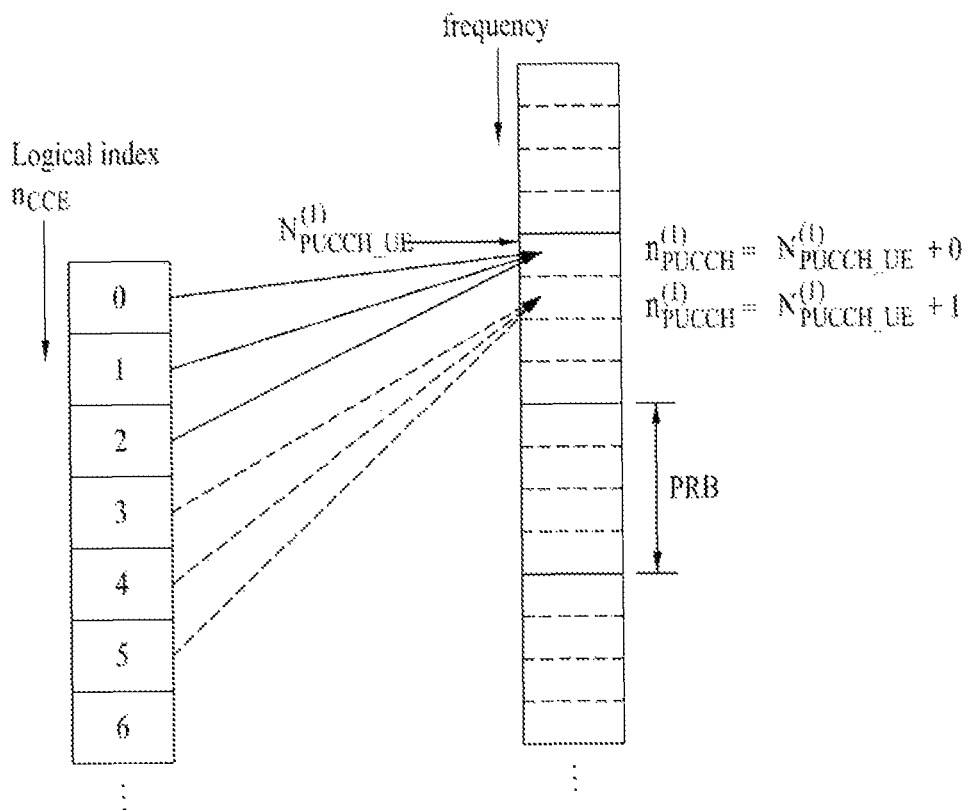
FIG. 8 illustrates an exemplary resource allocation for a control channel according to an embodiment of the present invention.

Referring to FIG. 8, because A is 3, 3 adjacent or consecutive logical CCE indexes $n_{CCE}$ may be mapped to one PUCCH resource.

In this case, for a PDCCH aggregation level L (e.g., L=1, 2, 4, and 8) of 1 or 2, if two or more consecutive or adjacent PDCCHs are received, PUCCH regions related to the two PDCCHs are overlapped. Thus, a network end (e.g., an eNB) may not schedule consecutive PDCCHs for a CoMP UE. For example, if a first PDCCH with L=2 is received in CCEs 0 and 1 ($n_{CCE}=0$ and $n_{CCE}=1$) and a second PDCCH with L=2 is received in CCEs 2 and 3 ($n_{CCE}=2$ and $n_{CCE}=3$), PUCCH regions determined by the smallest CCE indexes of the PDCCHs, $n_{CCE}=0$ and $n_{CCE}=2$ are mapped to a PUCCH index $N_{PUCCH\_UE}^{(1)}+0$, as illustrated in FIG. 8, resulting in collision between PUCCH resources of different CoMP UEs. Accordingly, the network end (e.g., the eNB) preferably allocates a PDCCH to a CoMP UE, avoiding the foregoing scheduling.

This scheduling operation may be performed as follows. CoMP UEs decode the same PDCCH as other legacy UEs connected to a specific DL serving point from which the PDCCHs are received, and the specific DL serving point schedules the same available resources, for example, CCEs 0 to $N_{CCE}-1$ for the legacy UEs and the CoMP UEs by dividing the resources. In this case, different PDCCHs scheduled in A consecutive CCE indexes $n_{CCE}$ for CoMP UEs are mapped to the same PUCCH region, thus colliding with each other, as illustrated in FIG. 8. To avoid this situation, the network end (e.g., the eNB) may schedule only one CoMP UE in a PDCCH corresponding to the A consecutive CCE indexes $n_{CCE}$, while scheduling the other PDCCHs to legacy UEs. In other words, the network end may schedule only one of PDCCHs having the first of the A consecutive CCE indexes $n_{CCE}$ for a UE set to a specific transmission mode (e.g., transmission mode 10), while scheduling the other PDCCHs for UEs set to other transmission modes.

If more CoMP UEs than legacy UEs are to be scheduled in this situation, a relatively large PUCCH region may be set for the CoMP UEs by resetting the parameter A to a relatively small value, that is, reducing a compression rate. For example, if A is set to 1, [Equation 11] may be identical to [Equation 5] designed for conventional PUCCH region determination. Accordingly, if the parameter A is indicated semi-statically or dynamically according to a traffic/load state, the conventional PUCCH region determination method is included in the embodiment of the present invention. Thus, the embodiment of the present invention is advantageously compatible with the conventional PUCCH region determination method.

The parameter A may also be configured UE-specifically and indicated semi-statically or dynamically. For a CoMP UE supporting UL-MIMO, an antenna port index may be additionally included in [Equation 11]. For example, [Equation 11] may be regarded as an equation for antenna port index 0 and a PUCCH resource index for antenna port index 1 may be determined by designing an equation for antenna port index 1 by adding a positive integer m to [Equation 11]. That is, an equation designed to reflect an additional antenna port index in [Equation 11] may be used, as is the case with the relationship between [Equation 6] and [Equation 7].

1-2. Example 2

In another PUCCH resource compression method, a plurality of CCE indexes may be mapped to one PUCCH resource index by applying a modulo function to the CCE indexes. For example, this method may be expressed as the following equation.

$$n_{PUCCH}^{(1)}=(n_{CCE} \bmod B)+N_{PUCCH\_UE}^{(1)} \qquad \text{[Equation 12]}$$

In [Equation 12], $N_{PUCCH\_UE}^{(1)}$ is a UE-specific PUCCH resource offset parameter received by the afore-described higher-layer signaling, indicating a starting point (index) of a new PUCCH region distinguished from a legacy PUCCH region determined based on an existing cell-specific PUCCH resource offset parameter $N_{PUCCH}^{(1)}$. Each PUCCH resource index $n_{PUCCH}^{(1)}$ of the new PUCCH region is determined to be $N_{PUCCH\_UE}^{(1)}$ plus only an integer obtained by applying the modulo function (or operation) to a parameter B by [Equation 12]. That is, the PUCCH resource index is determined to be the starting point of the new PUCCH region plus ($n_{CCE}$ mod B).

The parameter B may be indicated by higher-layer signaling and one of a plurality of values of the parameter B may selected. The parameter B may be configured UE-specifically and indicated semi-statically or dynamically.

For a CoMP UE supporting UL-MIMO, an antenna port index may be additionally included in [Equation 12]. For example, [Equation 12] may be regarded as an equation for antenna port index 0 and a PUCCH resource index for antenna port index 1 may be determined by designing an equation for antenna port index 1 by adding a positive integer m to [Equation 11]. That is, an equation designed to reflect an additional antenna port index in [Equation 12] may be used, as is the case with the relationship between [Equation 6] and [Equation 7].

Additionally, various modification examples of [Equation 12] will be described below.

The parameter B may be determined to be a value other than a common multiple between aggregation levels (L=2, 4, and 8) other than the aggregation level of 1 for a PDCCH (L=1) so as to prevent the value of ($n_{CCE}$ mod B) from being only a multiple of a specific L (L>1) value and restricting or allowing selection of the parameter B to make the parameter B be various positive integers. Then, PUCCH resource indexes broken down to an intended extent (e.g., PUCCH resource indexes having a specific granularity) may be allocated in the new PUCCH region.

Figure 9:
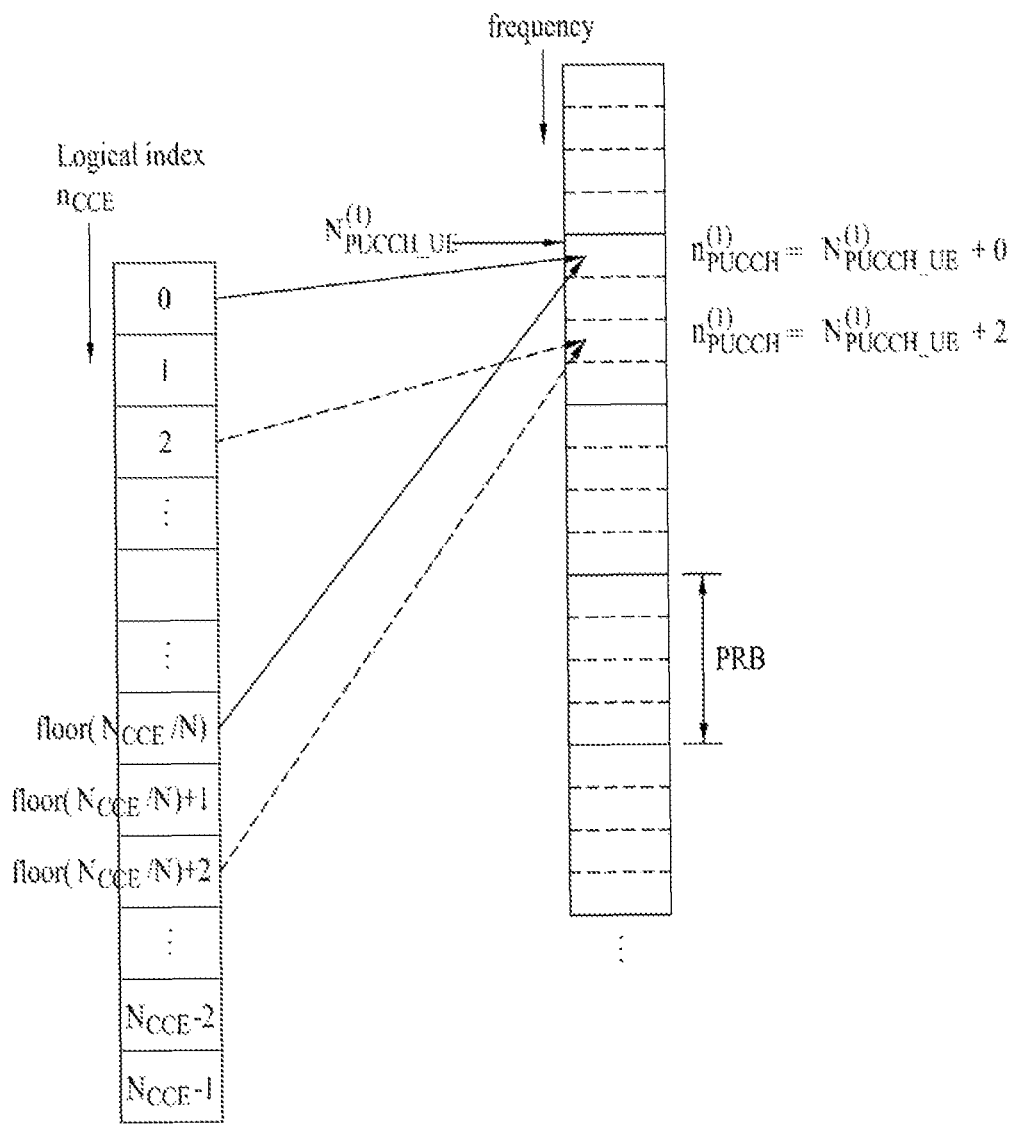
FIG. 9 illustrates an exemplary resource allocation for a control channel according to an embodiment of the present invention.

In an example of the above-described method, the parameter B may be defined as B=floor($N_{CCE}/N$). The floor function floor (X) represents a largest integer equal to or less than X. A plurality of logical PDCCH indexes $n_{CCE}$ may be mapped to one PUCCH resource index even with the defined parameter B according to the method of FIG. 9. Herein, N is a value that divides an area spanning the logical PDCCH indexes $n_{CCE}$ ranging from 0 to $N_{CCE}-1$. If N is 1, the conventional scheme expressed as [Equation 5] is implemented. If N is 2, the area spanning from index 0 to index $N_{CCE}-1$ may be divided into two parts, that is, a first PUCCH region spanning from index 0 to index floor($N_{CCE}/2$)-1 and a second PUCCH region including the other indexes. Thus, a PUCCH region compression ratio may be determined to be about 2:1. More specifically, if N is a divisor of $N_{CCE}$, that is, $N_{CCE}$ is an even number, the PUCCH region may be divided into two equal halves. As a consequence, the PUCCH region compression ratio may be accurately 2:1. If N is 3, the PUCCH region compression ratio may be about 3:1, similarly to the case with N=2. N may also be indicated semi-statically or dynamically.

As described in Example 1, a network end (e.g., an eNB) may operate as follows to avoid collision between PUCCH resources of CoMP UEs in a compressed PUCCH region in Example 2. CoMP UEs decode the same PDCCHs as other legacy UEs connected to a specific DL serving point from which the PDCCHs are received, and the specific DL serving point schedules the same available $n_{CCE}$ resources (PUCCH resource indexes 0 to $N_{CCE}-1$) for the legacy UEs and the CoMP UEs. Therefore, one of two or more PDCCHs associated with colliding PUCCH resources of the CoMP UE may be allocated to the CoMP UE and the other PDCCHs may be allocated to the legacy UEs, to thereby avoiding the PUCCH resource collision of the CoMP UE. In other words, the network end may schedule only one of the two or more PDCCHs for a UE set to a specific transmission mode (e.g., transmission mode 10), while scheduling the other PDCCHs for UEs set to other transmission modes.

If more CoMP UEs than legacy UEs are to be scheduled in this situation, a relatively large PUCCH region may be set for the CoMP UEs by resetting the parameter A or N to a relatively small value, that is, reducing a compression rate. For example, if B is set to 1, [Equation 12] may be identical to [Equation 5] designed for the conventional PUCCH region determination. Accordingly, if the parameter B or N is indicated semi-statically or dynamically according to a traffic/load state, the conventional PUCCH region determination method is included in the embodiment of the present invention. Thus, the embodiment of the present invention is compatible with the conventional PUCCH region determination method.

Embodiment 2

Another embodiment of the present invention provides a method for allocating a PDCCH so as to prevent the afore-described PUCCH resource collision.

2-1. Example 1

Example 1 provides a method for mitigating potential resource collision in a PUCCH region for a CoMP UE by imposing a specific constraint on $n_{CCE}$ to which a PDCCH with a specific PDCCH aggregation level may be mapped.

For example, mapping of a PDCCH with a PDCCH aggregation level of 1 (L=1) may be restricted to odd-numbered indexes $n_{CCE}$ and mapping of the smallest CCE index of a PDCCH with a PDCCH aggregation level of 2 (L=2) may be restricted to an even-numbered index $n_{CCE}$. In other words, while PDCCHs with L=1 may be allocated to all indexes $n_{CCE}$, a PDCCH associated with or linked to a PUCCH region for a CoMP UE may be mapped only to an odd-numbered index $n_{CCE}$ or an index $n_{CCE}$ being a multiple of a specific value (or a multiple of a specific value plus a specific offset value). In this manner, a specific constraint may be imposed on PDCCH mapping. Therefore, the CoMP UE may attempt blind decoding in a reduced number of indexes $n_{CCE}$, considering the above rule. Also, a similar constraint may be imposed on other PDCCH aggregation levels.

2-2. Example 2

Example 2 provides a method for securing the flexibility of PUCCH resource allocation by adding an offset to an index $n_{CCE}$ to which a PDCCH with a specific PDCCH aggregation level may be allocated, considering that the constraint imposed in Example 1 reduces the number of blind decodings at a CoMP UE but a network end (e.g., an eNB) may face limitations in flexibility of PUCCH resource allocation to a new PUCCH region due to the constraint.

For example, a specific offset value may be added to the smallest CCE index $n_{CCE}$ available for each specific aggregation level, for example, by allowing the smallest CCE index $n_{CCE}$ of a PDCCH with L=2, 4, or 8 to be an odd-numbered index $n_{CCE}$, beyond a conventional aggregation level-based tree structure that restricts the smallest CCE index $n_{CCE}$ of a PDCCH with L=2 to an even-numbered index $n_{CCE}$.

That is, while a PDCCH with an aggregation level L is conventionally allocated in such a manner that the smallest CCE of the PDCCH may be mapped only to a CCE index $n_{CCE}$ being a multiple of L, a PDCCH with an aggregation level L is allocated in such a manner that the smallest CCE of the PDCCH may be mapped to "a CCE index $n_{CCE}$ being a multiple of L"+"an offset being a specific integer" in Example 2. For example, [Equation 12] may be modified to [Equation 13].

$$n_{PUCCH}^{(1)} = (\{n_{CCE} + Y\} \bmod B) + N_{PUCCH\_UE}^{(1)} \quad \text{[Equation 13]}$$

That is, as a parameter Y is added, a PUCCH resource index may be shifted by an offset being a specific integer given as Y. For example, if bit information indicating Y is 1 bit, the bit represents one of 0 and 1. If the bit information is 2 bits, one of 0, 1, 2, and 4 is determined as Y.

In another method, an additional parameter with which to determine the parameter Y, for example, a PDCCH aggregation level L may be used in defining Y as Y=L/2 (for L>1). If L is 2, Y is 1. If L is 4, Y is 2. That is, the parameter Y reflecting the specific offset value may be set in a manner that changes the width of the offset according to the aggregation level L.

As illustrated in [Equation 13], information indicating whether to activate the operation of adding the parameter Y as an offset to $n_{CCE}$ may be indicated by higher-layer signaling and may be provided UE-specifically.

2-3. Example 3

In Example 3, the constraint may be imposed that a PDCCH linked to the new PUCCH region (i.e., a PDCCH for a CoMP UE in the afore-described HetNet situation) should be transmitted only for a specific aggregation level L. For example, considering that a CoMP UE is located usually at a cell edge and the cell edge generally suffers from poor DL signal quality, the CoMP UE is restricted to reception of a PDCCH with "L=8", "L=4 or 8", or "L=2, 4, or 8". Consequently, the number of blind decodings at the UE may be decreased remarkably.

Or since the highest aggregation level L of 8 (L=8) increases PDCCH overhead, the CoMP UE may be restricted to reception of a PDCCH with "L=2 or 4" or "L=4" by excluding a case with L=8. Thus, the UE may be notified to consider only a specific L value.

That is, UE-specific information indicating specific aggregation levels L so that a UE may attempt blind decoding of PDCCHs only having the aggregation levels L may be indicated semi-statically or dynamically in advance by higher-layer signaling (e.g., Radio Resource Control (RRC) signaling). For example, the dynamic indication method may include implicit linkage to PDCCH bits, subframe indexes (on a specific subframe set basis), or a specific DCI format(s).

Embodiment 3

In the foregoing methods, a plurality of $N_{PUCCH\_UE}^{(1)}$ values may be indicated preliminarily to a specific UE by UE-specific higher-layer signaling (e.g., RRC signaling) and a specific one of the $N_{PUCCH\_UE}^{(1)}$ values may be indicated dynamically (e.g., implicitly linked to a PDCCH bit(s), a subframe index (on a specific subframe set basis), or a specific DCI format(s)).

Although a CoMP UE receives a PDCCH from a DL serving point, the CoMP UE may transmit a PUCCH carrying an ACK/NACK for the PDSCH to a UL point. Since a legacy PUCCH region of legacy UEs connected to the UL point varies with the length of a control channel of the UL point (e.g., expressed as the number of OFDM symbols in a control channel region, indicated by a PCFICH, for example, one to three OFDM symbols), the legacy PUCCH region may change in size. As the CoMP UE does not decode a control channel of the UL point, it does not know whether the size of the legacy PUCCH region has been changed. Accordingly, if the starting point of a new PUCCH region is fixed to one $N_{PUCCH\_UE}^{(1)}$ value, a frequency gap may be widened between the legacy PUCCH region and the new PUCCH region, when the legacy PUCCH region is configured to be very small (e.g., the PCFICH value is 1 and thus only one OFDM symbol is allocated as the control channel region). Although resources need to be used efficiently along the frequency axis with the gap, for example, by additional PUSCH scheduling, this operation may be difficult due to various factors such as an insufficient gap. Therefore, as a plurality of $N_{PUCCH\_UE}^{(1)}$ values are indicated preliminarily to the CoMP UE and a specific one of the $N_{PUCCH\_UE}^{(1)}$ values is PUCCH UE indicated dynamically to the CoMP UE, the starting point of the new PUCCH region is changed according to a change in the size of the legacy PUCCH region of the UL point to which the CoMP UE is supposed to transmit an ACK/NACK in the new PUCCH region. As a result, resource use efficiency can be increased.

Embodiment 4

It has been described in relation to the foregoing methods that a plurality of CCE indexes $n_{CCE}$ may be linked to one PUCCH resource index $n_{PUCCH}^{(1)}$ and thus a network end (e.g., an eNB) may preferably allocate only one of the CCE indexes $n_{CCE}$ to a CoMP UE, while allocating the other CCE indexes $n_{CCE}$ to legacy UEs belonging to a DL serving point. It may be contemplated as another effective method that two or more of the plurality of CCE indexes $n_{CCE}$ linked to the one PUCCH resource index $n_{PUCCH}^{(1)}$ may be allocated to different CoMP UEs. That is, CoMP UEs are geographically apart enough from one another and thus have the same DL serving point, for example, a macro eNB. However, the CoMP UEs transmit ACK/NACK signals for PDCCHs received from the macro eNB to different UL points (e.g., pico eNBs, RRHs, etc. see FIG. 6). Then even though the same PUCCH resources are allocated to the CoMP UEs, power causing mutual interference may be negligibly small and thus PUCCH resources may be reused spatially. In this case, each CoMP may generate a sequence for its PUCCH using a different cell ID in another method. That is, a Physical layer Cell ID (PCI) or a Virtual Cell ID (VCI) used for a UL point(s) associated with each CoMP UE may be indicated preliminarily to the CoMP UE, for use in generating a PUCCH sequence at the CoMP UE.

Embodiment 5

PUCCH resources may be allocated to the new PUCCH region semi-statically and the PUCCH resource allocation may be configured by higher-layer signaling (e.g., RRC signaling). Also, dynamic switching may be available between the semi-statically allocated PUCCH resources. The dynamic switching may be performed by implicit linkage to, for example, a PDCCH bit(s), a subframe index, or a specific DIC format(s).

Parameters required to generate a PUCCH sequence for transmission in the semi-statically allocated PUCCH resources may be indicated by higher-layer signaling. For example, the parameters may include a VCI for a PUCCH, $\Delta_{shift}^{PUCCH}$ that determines a CS spacing for use in determining a PUCCH OCC+CS index, $\Delta\delta_{shift}^{PUCCH}$ that is configured cell-specifically for ICI randomization, and an amplitude scaling factor $\beta_{PUCCH}$.

The VCI ranges from 0 to 503, replacing a PCI used for PUCCH sequence generation and CS hopping.

The cell-specific parameter $\Delta_{shift}^{PUCCH}$ that determines a CS spacing for use in determining a PUCCH OCC+CS index is given as $$\Delta_{shift}^{PUCCH} \in \left\{ \begin{array}{l} \{[1], 2, 3\} \\ \{2, 3\} \end{array} \right\} \begin{array}{l} \text{for normal cyclic prefix} \\ \text{for extended cyclic prefix} \end{array}$$

The cell-specific parameter $\Delta\delta_{shift}^{PUCCH}$ for ICI randomization is given as $$\delta_{shift}^{PUCCH} \in \{0, 1, \ldots, \Delta_{shift}^{PUCCH} - 1\}$$

The amplitude scaling factor is $\beta_{PUCCH}$.

That is, each of the parameters including the VCI for the PUCCH may be linked to a PUCCH resource(s) configured semi-statically by higher-layer signaling and the PUCCH resource(s) may be indicated dynamically using a specific bit(s) of a DL-related DCI format(s) including a DL scheduling grant in order to allow a CoMP UE to dynamically transmit a PUCCH to a plurality of UL (reception) points.

Figure 10:
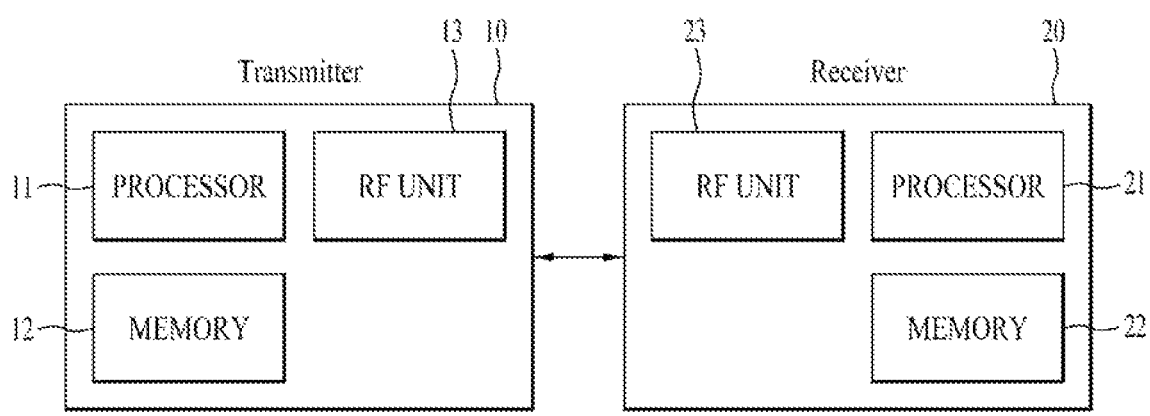
FIG. 10 is a block diagram of apparatuses that may implement embodiments of the present invention.

FIG. 10 is a block diagram of apparatuses configured to perform a UL transmission-related operation according to an embodiment of the present invention. A transmitter 10 and a receiver 20 include Radio Frequency (RF) units 13 and 23 for transmitting or receiving a wireless signal carrying information and/or data, a signal, a message, etc., memories 12 and 22 for storing various types of information related to communication in a wireless communication system, and processors 11 and 21 connected operatively to components such as the RF units 13 and 23 and the memories 12 and 22, for controlling the memories 12 and 22 and/or the RF units 13 and 23 to perform at least one of the afore-described embodiments of the present invention.

The memories 12 and 22 may temporarily store programs for processing and control of the processors 11 and 21 and input/output information. The memories 12 and 22 may be used as buffers.

The processors 11 and 21 generally provide overall control to various modules in the transmitter 10 and the receiver 20. The processors 11 and 21 may be called controllers, microcontrollers, microprocessors, microcomputers, etc. The processors 11 and 21 may be achieved by hardware, firmware, software, or a combination thereof. In a hardware configuration, the processors 11 and 21 may include Application Specific Integrated Circuits (ASICs), Digital Signal Processors (DSPs), Digital Signal Processing Devices (DSPDs), Programmable Logic Devices (PLDs), Field Programmable Gate Arrays (FPGAs), etc. that are configured to perform the present invention. In a firmware or software configuration, the firmware or the software may be configured to include a module, a procedure, a function, etc. that performs functions or operations of the present invention. The firmware or software configured to implement the present invention may be included in the processors 11 and 21 or may be stored in the memories 12 and 22 and executed by the processors 11 and 21.

The processor 11 of the transmitter 10 encodes and modulates a signal and/or data scheduled for transmission by the processor 11 or by a scheduler connected to the processor 11 in a predetermined coding and modulation scheme and transmits the coded and modulated signal and/or data to the RF unit 13. For example, the processor 11 converts a data stream to be transmitted to K layers by demultiplexing, channel coding, scrambling, modulation, etc. The coded data stream is called a codeword equivalent to a Transport Block (TB) which is a data block provided by a Medium Access Control (MAC) layer. A TB is encoded to a codeword and each codeword is transmitted in the form of one or more layers to a receiver. The RF unit 13 may include an oscillator, for frequency upconversion. The RF unit 13 may include Nt (a positive integer) transmission antennas.

The receiver 20 processes a signal in reverse order of the signal processing of the transmitter 10 under the control of the processor 21. The RF unit 23 of the receiver 20 receives a wireless signal from the transmitter 10 under the control of the processor 21. The RF unit 23 may include Nr (a positive integer) reception antennas. The RF unit 23 recovers each signal received through the reception antennas to a baseband signal by frequency downconversion. The RF unit 23 may include an oscillator, for frequency downconversion. The processor 21 may recover the data transmitted by the transmitter 10 by decoding and demodulating wireless signals received through the reception antennas.

Each of the RF units 13 and 23 includes one or more antennas. The antennas transmit signals processed by the RF units 13 and 23 or receive external wireless signals and transmit the received wireless signals to the RF units 13 and 23, under the control of the processors 11 and 21. An antenna is also called an antenna port. Each antenna may correspond to one physical antenna or may include two or more physical antenna elements. The receiver 20 may not further decompose a signal transmitted by each antenna. An RS transmitted through an antenna defines the antenna from the viewpoint of the receiver 20. The RS enables the receiver 20 to perform channel estimation for the antenna irrespective of whether a channel is a single radio channel from one physical antenna or a composite channel from a plurality of physical antenna elements included in the antenna. That is, the antenna is defined so that a channel carrying a symbol from the antenna may be derived from a channel carrying another symbol from the same antenna. An RF unit supporting MIMO in which data is transmitted and received using multiple antennas may be connected to two or more antennas.

In the embodiments of the present invention, a UE or a relay operates as the transmitter 10 on UL and as the receiver 20 on DL. In the embodiments of the present invention, a BS operates as the receiver 20 on UL and as the transmitter 10 on DL. In the embodiments of the present invention, each of a UE and its peer UE operates as the transmitter 10 on UL for Device-to-Device (D2D) communication and as the receiver 20 on DL for D2D communication.

A specific structure of a UE or a BS functioning as the above receiver or transmitter may be realized so as to apply the various embodiments of the present invention described before with reference to the attached drawings independently or to apply two or more embodiments of the present invention at the same time.

Those skilled in the art will appreciate that the present invention may be carried out in other specific ways than those set forth herein without departing from the spirit and essential characteristics of the present invention. The above embodiments are therefore to be construed in all aspects as illustrative and not restrictive. The scope of the invention should be determined by the appended claims and their legal equivalents, not by the above description, and all changes coming within the meaning and equivalency range of the appended claims are intended to be embraced therein.

INDUSTRIAL APPLICABILITY

The embodiments of the present invention are applicable to a BS, a UE, or other devices in a wireless communication system.

The invention claimed is:

1. A method for transmitting uplink control information in a wireless communication system, the method comprising:
   detecting downlink control information in a downlink control channel and transmitting uplink control information via resources for an uplink control channel, determined based on a Control Channel Element (CCE) index of the downlink control channel from which the downlink control information is detected and a User Equipment (UE)-specific offset value configured for determination of the resources for the uplink control channel,
   wherein uplink control information related to at least two downlink control channels having different first CCE indexes is allocated to the same resources for the uplink control channel.

2. The method according to claim 1, wherein the resources for the uplink control channel are determined by the following equation, $$n_{PUCCH}^{(1)} = \text{floor}(n_{CCE}/A) + N_{PUCCH\_UE}^{(1)}$$

where $n_{PUCCH}^{(1)}$ is an index of the resources for the uplink control channel, $N_{PUCCH\_UE}^{(1)}$ is the UE-specific offset value used for determination of resources for the uplink control channel, floor(X) is a largest integer equal to or less than X, $n_{CCE}$ is the first CCE index of the downlink control channel, and A is an integer equal to or larger than 1.

3. The method according to claim 1, wherein the resources for the uplink control channel are determined by the following equation, $$n_{PUCCH}^{(1)} = (n_{CCE} \bmod B) + N_{PUCCH\_UE}^{(1)}$$

where $n_{PUCCH}^{(1)}$ is an index of the resources for the uplink control channel, $N_{PUCCH\_UE}^{(1)}$ is the UE-specific offset value used for determination of resources for the uplink control channel, Y mod Z is a remainder of dividing Y by Z, $n_{CCE}$ is the first CCE index of the downlink control channel, and B is an integer equal to or larger than 1.

4. The method according to claim 3, wherein B=floor($N_{CCE}$/N), where $N_{CCE}$ is a total number of CCEs in the downlink control channel and N is an integer equal to or larger than 1.

5. The method according to claim 1, wherein the UE-specific offset used for determination of resources for the uplink control channel is one of a plurality of candidate UE-specific offset values received by higher-layer signaling.

6. A User Equipment (UE) for transmitting uplink control information in a wireless communication system, the UE comprising:
   a Radio Frequency (RF) unit; and
   a processor configured to control the RF unit, wherein the processor is configured to detect downlink control information in a downlink control channel and transmit uplink control information via resources for an uplink control channel, determined based on a Control Channel Element (CCE) index of the downlink control channel from which the downlink control information is detected and a User Equipment (UE)-specific offset value configured for determination of the resources for the uplink control channel, and wherein uplink control information related to at least two downlink control channels having different first CCE indexes is allocated to the same resources for the uplink control channel.

7. The UE according to claim 6, wherein the resources for the uplink control channel are determined by the following equation, $$n_{PUCCH}^{(1)} = \text{floor}(n_{CCE}/A) + N_{PUCCH\_UE}^{(1)}$$

where $n_{PUCCH}^{(1)}$ is an index of the resources for the uplink control channel, $N_{PUCCH\_UE}^{(1)}$ is the UE-specific offset value used for determination of resources for the uplink control channel, floor(X) is a largest integer equal to or less than X, $n_{CCE}$ is the first CCE index of the downlink control channel, and A is an integer equal to or larger than 1.

8. The UE according to claim 6, wherein the resources of the uplink control channel resource are determined by the following equation, $$n_{PUCCH}^{(1)} = (n_{CCE} \bmod B) + N_{PUCCH\_UE}^{(1)}$$

where $n_{PUCCH}^{(1)}$ is an index of the resources for the uplink control channel, $N_{PUCCH\_UE}^{(1)}$ is the UE-specific offset value used for determination of resources for the uplink control channel, Y mode Z is a remainder of dividing Y by Z, $n_{CCE}$ is the first CCE index of the downlink control channel, and B is an integer equal to or larger than 1.

9. The UE according to claim 8, wherein B=floor($N_{CCE}$/N), where $N_{CCE}$ is a total number of CCEs in the downlink control channel and N is an integer equal to or larger than 1.

10. The UE according to claim 6, wherein the UE-specific offset used for determination of resources for the uplink control channel is one of a plurality of candidate UE-specific offset values received by higher-layer signaling.

11. A method for determining resources for an uplink control channel in a wireless communication system, the method comprising:

determining resources for the uplink control channel, for transmission of uplink control information from each User Equipment (UE), based on a Control Channel Element (CCE) index of a downlink control channel from which downlink control information is detected by the UE and a UE-specific offset value configured for determination of resources for the uplink control channel, wherein uplink control information related to at least two downlink control channels having different first CCE indexes is allocated to the same resources for the uplink control channel.

12. The method according to claim 11, wherein the resources for the uplink control channel are determined by the following equation, $$n_{PUCCH}^{(1)} = \text{floor}(n_{CCE}/A) + N_{PUCCH\_UE}^{(1)}$$

where $n_{PUCCH}^{(1)}$ is an index of the resources for the uplink control channel, $N_{PUCCH\_UE}^{(1)}$ is the UE-specific offset value used for determination of resources for the uplink control channel, floor(X) is a largest integer equal to or less than X, $n_{CCE}$ is the first CCE index of the downlink control channel, and A is an integer equal to or larger than 1.

13. The method according to claim 11, wherein resources for the uplink control channel are determined by the following equation, $$n_{PUCCH}^{(1)} = (n_{CCE} \bmod B) + N_{PUCCH\_UE}^{(1)}$$

where $n_{PUCCH}^{(1)}$ is an index of the resources for the uplink control channel, $N_{PUCCH\_UE}^{(1)}$ is the UE-specific offset value used for determination of resources for the uplink control channel, Y mode Z is a remainder of dividing Y by Z, $n_{CCE}$ is the first CCE index of the downlink control channel, and B is an integer equal to or larger than 1.

14. The method according to claim 13, wherein B=floor($N_{CCE}$/N) where $N_{CCE}$ is a total number of CCEs in the downlink control channel and N is an integer equal to or larger than 1.

15. The method according to claim 11, wherein only one of the at least two downlink control channels is allocated to a UE configured with a predetermined transmission mode and the other downlink control channels are allocated to a UE configured with another transmission mode.

16. A Base Station (BS) for determining resources of an uplink control channel in a wireless communication system, the BS comprising:

a Radio Frequency (RF) unit; and a processor configured to control the RF unit, wherein the processor is configured to determine resources of an uplink control channel, for transmission of uplink control information from each User Equipment (UE), based on a Control Channel Element (CCE) index of a downlink control channel from which downlink control information is detected by the UE and a UE-specific offset value configured for determination of resources for the uplink control channel, and wherein uplink control information related to at least two downlink control channels having different first CCE indexes is allocated to the same resources for the uplink control channel.

17. The BS according to claim 16, wherein the resources for the uplink control channel are determined by the following equation, $$n_{PUCCH}^{(1)} = \text{floor}(n_{CCE}/A) + N_{PUCCH\_UE}^{(1)}$$

where $n_{PUCCH}^{(1)}$ is an index of the resources for the uplink control channel, $N_{PUCCH\_UE}^{(1)}$ is the UE-specific offset value used for determination of resources for the uplink control channel, floor(X) is a largest integer equal to or less than X, $n_{CCE}$ is the first CCE index of the downlink control channel, and A is an integer equal to or larger than 1.

18. The BS according to claim 16, wherein the resources for the uplink control channel are determined by the following equation, $$n_{PUCCH}^{(1)} = (n_{CCE} \bmod B) + N_{PUCCH\_UE}^{(1)}$$

where $n_{PUCCH}^{(1)}$ is an index of resources for the uplink control channel, $N_{PUCCH\_UE}^{(1)}$ is the UE-specific offset value used for determination of resources for the uplink control channel, Y mode Z is a remainder of dividing Y by Z, $n_{CCE}$ is the first CCE index of the downlink control channel, and B is an integer equal to or larger than 1.

19. The BS according to claim 18, wherein B=floor($N_{CCE}$/N) where $N_{CCE}$ is a total number of CCEs in the downlink control channel and N is an integer equal to or larger than 1.

20. The BS according to claim 16, wherein only one of the at least two downlink control channels is allocated to a UE configured with a predetermined transmission mode and the other downlink control channels are allocated to a UE configured with another transmission mode.

\* \* \* \* \*